United States Patent
Yabune et al.

(10) Patent No.: US 11,994,219 B2
(45) Date of Patent: May 28, 2024

(54) SIDE RAIL AND OIL CONTROL RING COMPRISING SAME

(71) Applicant: KABUSHIKI KAISHA RIKEN, Tokyo (JP)

(72) Inventors: Hiroyuki Yabune, Kashiwazaki (JP); Yoshiyuki Hirade, Kashiwazaki (JP); Kentaro Miyagawa, Kashiwazaki (JP)

( * ) Notice: Subject to any disclaimer, the term of this patent is extended or adjusted under 35 U.S.C. 154(b) by 0 days.

(21) Appl. No.: 18/550,701

(22) PCT Filed: Mar. 4, 2022

(86) PCT No.: PCT/JP2022/009505
§ 371 (c)(1),
(2) Date: Sep. 15, 2023

(87) PCT Pub. No.: WO2022/209592
PCT Pub. Date: Oct. 6, 2022

(65) Prior Publication Data
US 2024/0084894 A1     Mar. 14, 2024

(30) Foreign Application Priority Data
Mar. 31, 2021 (JP) .................... 2021-059654

(51) Int. Cl.
*F16J 9/20* (2006.01)

(52) U.S. Cl.
CPC ..................... *F16J 9/20* (2013.01)

(58) Field of Classification Search
CPC ........................................ F16J 9/20
See application file for complete search history.

(56) References Cited

U.S. PATENT DOCUMENTS

| 2,614,899 | A | * | 10/1952 | Phillips | F16J 9/063 |
|---|---|---|---|---|---|
| | | | | | 277/444 |
| 2,712,971 | A | * | 7/1955 | Phillips | F16J 9/069 |
| | | | | | 277/444 |
| 2,938,758 | A | * | 5/1960 | Phillips | F16J 9/20 |
| | | | | | 277/444 |
| 10,253,882 | B2 | * | 4/2019 | Sytsma | F16J 9/066 |
| 10,890,255 | B2 | * | 1/2021 | Hoshino | F16J 9/06 |
| 2004/0061291 | A1 | * | 4/2004 | Takiguchi | F16J 9/068 |
| | | | | | 277/446 |
| 2009/0243225 | A1 | | 10/2009 | Matsushima et al. | |

(Continued)

FOREIGN PATENT DOCUMENTS

| JP | H6-185620 | 7/1994 |
|---|---|---|
| JP | H8-261325 | 10/1996 |

(Continued)

*Primary Examiner* — Vishal A Patel
(74) *Attorney, Agent, or Firm* — SOEI PATENT & LAW FIRM

(57) ABSTRACT

A side rail forms an oil control ring together with a spacer expander, and includes: an outer peripheral surface; an inner peripheral surface having a vertically symmetrical shape in an axial cross section; a first side surface; and a second side surface. The inner peripheral surface includes an inner tip portion satisfying following Condition 1 in an axial cross section.

$0.7 \leq R1/h0 \leq 1.1$     Condition 1:

In the expression, R1 represents a curvature radius (unit: mm) of a curve forming the inner tip portion, and h0 represents a height (unit: mm) of the side rail.

13 Claims, 22 Drawing Sheets

(56) References Cited

U.S. PATENT DOCUMENTS

| | | | | |
|---|---|---|---|---|
| 2011/0100318 A1* | 5/2011 | Higuchi | ............... | F16J 9/26 |
| | | | | 123/193.6 |
| 2018/0031127 A1 | 2/2018 | Takezawa et al. | | |
| 2018/0038483 A1 | 2/2018 | Shimizu et al. | | |
| 2018/0051806 A1 | 2/2018 | Murata et al. | | |
| 2020/0248808 A1* | 8/2020 | Iwata | ............... | F16J 9/068 |
| 2021/0164566 A1 | 6/2021 | Shimizu et al. | | |
| 2021/0180695 A1* | 6/2021 | Bärenreuter | ............... | F16J 9/20 |
| 2021/0332885 A1 | 10/2021 | Böhnke et al. | | |

FOREIGN PATENT DOCUMENTS

| | | | | |
|---|---|---|---|---|
| JP | 2016-156411 | | 9/2016 | |
| JP | 2016-169791 | | 9/2016 | |
| JP | 2016156411 A | * | 9/2016 | ............ F16J 9/06 |
| JP | 2016169791 A | * | 9/2016 | ............ F16J 9/06 |
| JP | 2019-124346 | | 7/2019 | |
| JP | 2020-204349 | | 12/2020 | |
| WO | 2005/066482 | | 7/2005 | |
| WO | WO-2016143315 A1 | * | 9/2016 | ............ F16J 9/06 |
| WO | 2016/159269 | | 10/2016 | |
| WO | 2019/194104 | | 10/2019 | |
| WO | 2020/035188 | | 2/2020 | |
| WO | 2020/251058 | | 12/2020 | |

\* cited by examiner

SIDE RAIL AND OIL CONTROL RING COMPRISING SAME

CROSS-REFERENCE TO RELATED APPLICATIONS

This application is a 35 U.S.C. § 371 national phase application of PCT/JP2022/009505, filed on Mar. 4, 2022, which claims priority to Japanese Patent Application No. 2021-059654, filed on Mar. 31, 2021.

TECHNICAL FIELD

The present disclosure relates to a side rail and an oil control ring including the same.

BACKGROUND ART

An oil control ring is intended to form an appropriate oil film on an inner surface of a cylinder bore. The oil control ring scrapes off excess engine oil as a piston reciprocates. As the oil control ring, a form referred to as a three-piece oil ring is known (refer to Patent Literatures 1 and 2). The three-piece oil ring includes a pair of side rails and a spacer expander disposed therebetween. The side rails are ring-shaped parts, and outer peripheral surfaces of the side rails abut against the inner surface of the cylinder bore, and side surfaces thereof abut against inner surfaces of a groove of the piston. The spacer expander includes ear portions against which inner peripheral surfaces of the side rails abut, and side rail support portions facing the side surfaces of the side rails (refer to FIGS. 1 and 2 of Patent Literature 1).

CITATION LIST

Patent Literature

Patent Literature 1: International Publication WO 2016/159269
Patent Literature 2: Japanese Unexamined Patent Publication No. 2020-204349

SUMMARY OF INVENTION

Technical Problem

In the recent years, from the viewpoint of environmental protection, efforts have been made to increase power output, improve fuel efficiency, and reduce emissions of an internal combustion engine represented by an automotive engine. For example, from the viewpoint of increasing power output, the internal combustion engines tend to operate at a higher rotation speed compared to that in the related art. The inventors have focused on the phenomenon that the oil consumption amount increases when the average speed of the reciprocation is higher than 20 m/s.

The present disclosure provides a side rail and an oil control ring including the same that are capable of sufficiently suppressing an increase in oil consumption amount even when an internal combustion engine operates at a high rotation speed.

Solution to Problem

A side rail according to the present disclosure forms an oil control ring together with a spacer expander. The side rail includes: an outer peripheral surface; an inner peripheral surface having a vertically symmetrical shape in an axial cross section; a first side surface; and a second side surface. The inner peripheral surface includes an inner tip portion satisfying the following Condition 1 in an axial cross section.

$$0.7 \leq R1/h0 \leq 1.1 \qquad \text{Condition 1:}$$

In the expression, R1 represents a curvature radius (unit mm) of a curve forming the inner tip portion, and h0 represents a height (unit: mm) of the side rail. Incidentally, a contour shape (shapes of the inner peripheral surface, the outer peripheral surface, and the like) of the side rail can be measured using a contour shape measuring machine (for example, manufactured by TOKYO SEIMITSU CO., LTD.).

In the side rail included in the oil control ring of the related art, the inner peripheral surface is rounded in a semicircular shape (refer to FIG. 1 of Patent Literature 1). In contrast, the inner peripheral surface of the side rail according to the present disclosure is not rounded compared to the inner peripheral surface of the side rail of the related art. Namely, the inner tip portion of the inner peripheral surface satisfies Condition 1. Incidentally, when the inner peripheral surface has a semicircular shape, the value of R1/h0 is 0.5.

According to studies by the inventors, since the inner tip portion of the inner peripheral surface satisfies Condition 1, even when an internal combustion engine operates at a high rotation speed, the oil consumption amount can be sufficiently suppressed. It is presumed that the reason is that the behavior of the side rail is stabilized during high-speed operation and the side surface of the side rail easily abuts against an inner surface of a groove of a piston, thereby sealing performance is improved. The behavior of the side rail is affected by frictional force with a cylinder and inertial force associated with reciprocation. It is presumed that since an increase in reciprocating speed increases the inertia force acting on the oil control ring, the influence of the inertia force is more dominant than the influence of the frictional force. Since the inner tip portion satisfies Condition 1, the center of gravity is shifted to an inner peripheral surface side compared to the side rail of the related art, and the position where the inner tip portion abuts ear portions of the spacer expander is shifted. It is presumed that these factors contribute to stabilizing the behavior of the side rail.

An oil control ring according to the present disclosure includes a pair of side rails and a spacer expander disposed between the pair of side rails. Both the pair of side rails are the side rails according to the present disclosure. According to the oil control ring, even when an internal combustion engine operates at a high rotation speed, an increase in oil consumption amount can be sufficiently suppressed.

Advantageous Effects of Invention

According to the present disclosure, the side rail and the oil control ring including the same that are capable of sufficiently suppressing an increase in oil consumption amount even when the internal combustion engine operates at a high rotation speed are provided.

DESCRIPTION OF EMBODIMENTS

Figure 1:
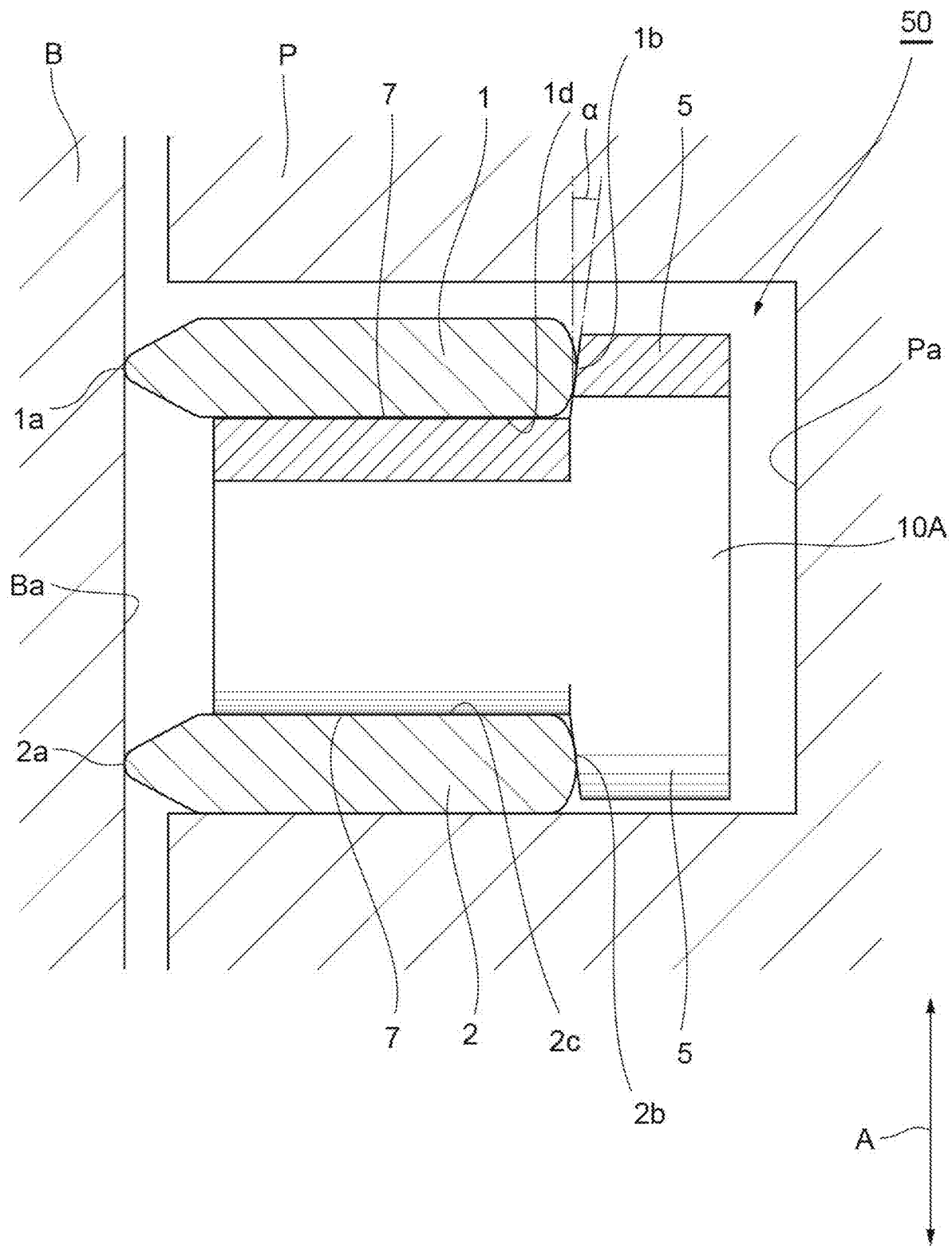
FIG. 1 is a schematic cross-sectional view showing a state where an oil control ring according to one embodiment of the present disclosure is mounted in a groove of a piston.

Hereinafter, embodiments of the present disclosure will be described in detail with reference to the drawings. In the following description, the same or corresponding portions are denoted by the same reference signs, and duplicate descriptions will be omitted. In addition, unless otherwise specified, positional relationships such as up, down, left, right, and the like are based on positional relationships shown in the drawings. The dimensional ratios in the drawings are not limited to the ratios shown in the drawings. When terms such as "left", "right", "front", "back", "up", "down", "upper", and "lower" are used in the description and claims of this specification, the terms are used for descriptive purposes, and do not necessarily mean permanent relative positions.

<Oil Control Ring>

FIG. 1 is a schematic cross-sectional view showing a state where an oil control ring 50 according to the present embodiment is mounted in a groove Pa of a piston P. The cross-sectional view shows a cross section taken in an axial direction of the oil control ring (reciprocating direction A of the piston P). As shown in FIG. 1, the oil control ring 50 includes a pair of side rails 1 and 2 and a spacer expander 10A disposed between the pair of side rails 1 and 2. Outer peripheral surfaces 1a and 2a of the side rails 1 and 2 are in contact with an inner surface Ba of a cylinder bore B. Inner peripheral surfaces 1b and 2b of the side rails 1 and 2 are in contact with ear portions 5 of the spacer expander 10A.

[Side Rail]

The material of the side rails 1 and 2 is, for example, stainless steel or carbon steel. The side rails 1 and 2 may include hard coatings (not shown) provided to cover at least outer peripheral surfaces 1a and 2a. Examples of the material of the hard coating include amorphous carbon, chromium nitride (CrN), titanium nitride (TiN), titanium carbide (TiC), aluminum titanium nitride (TiAlN), chromium nitride (CrN), TiCN, AlCrN, TiC, nickel (Ni), and nickel alloy such as nickel phosphorous (NiP). As shown in FIG. 1, in the present embodiment, the side rails 1 and 2 have the same shape. Hereinafter, the shape of the side rail 1 will be described, and the description of the side rail 2 will be omitted.

Figure 2A:
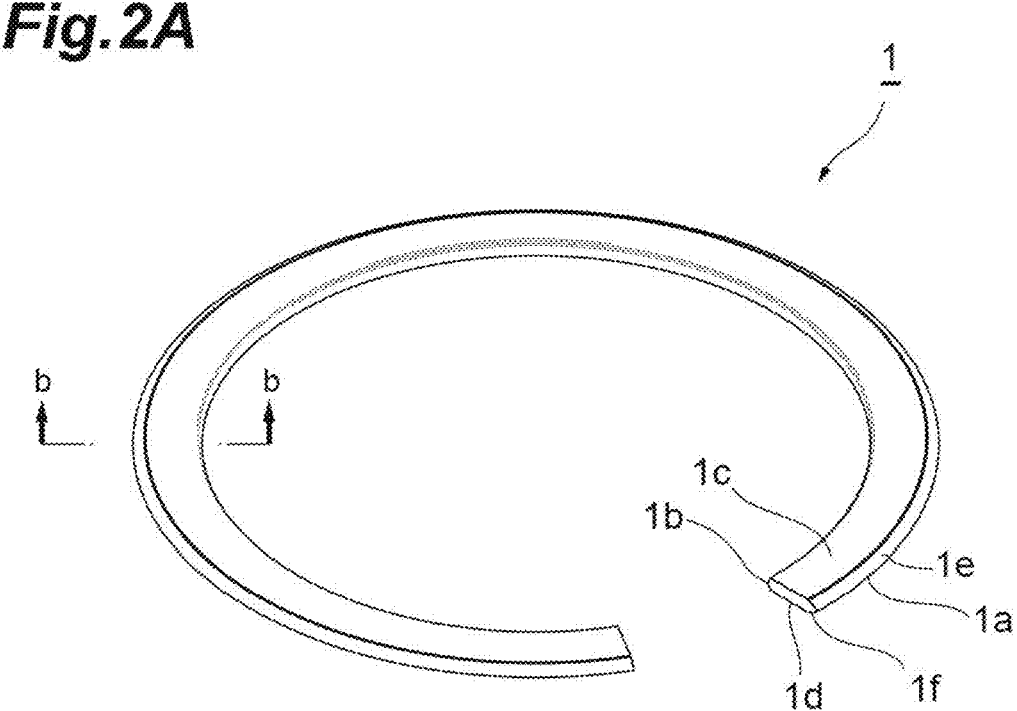
FIG. 2A is a perspective view of a side rail shown in FIGS. 1.
Figure 2B:
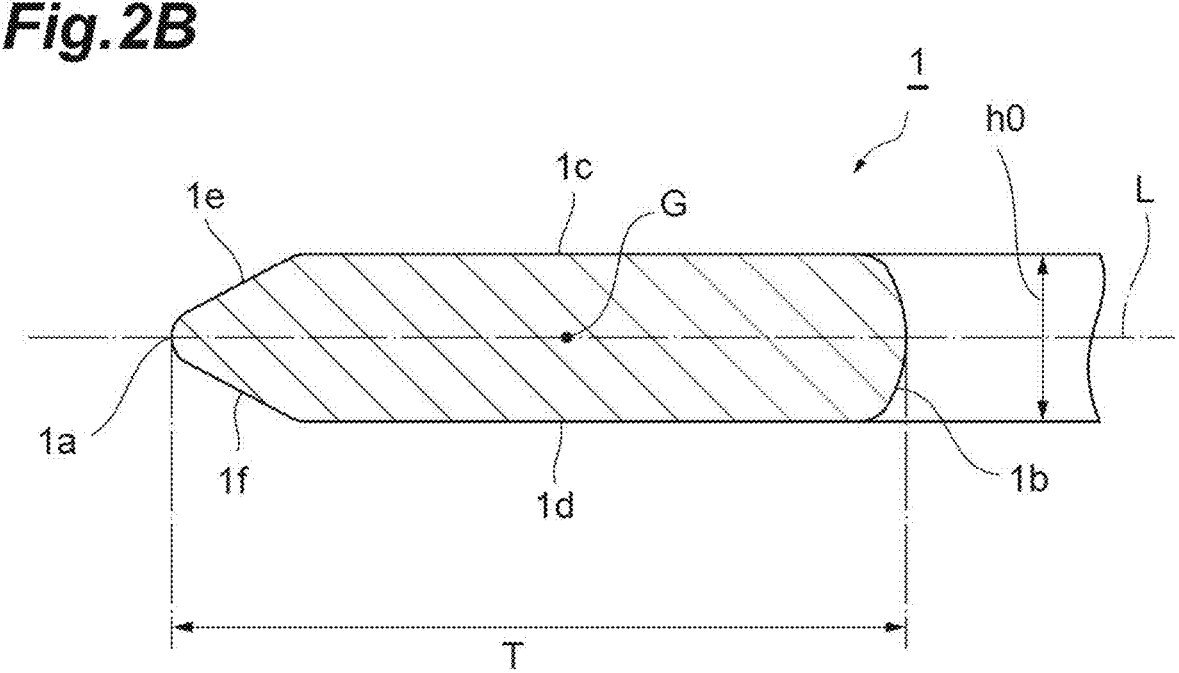
FIG. 2B is a cross-sectional view taken along line b-b shown in FIG. 2A.

FIG. 2A is a perspective view of the side rail 1, and FIG. 2B is a cross-sectional view taken along line b-b shown in FIG. 2A. The side rail 1 has a vertically symmetrical shape with respect to a center line L indicated by an alternating long and short dashed line in FIG. 2B, in an axial cross section. The side rail 1 has the outer peripheral surface $1a$; the inner peripheral surface $1b$; first and second side surfaces $1c$ and $1d$; a first inclined surface $1e$ between the outer peripheral surface $1a$ and the first side surface $1c$; and a second inclined surface $1f$ between the outer peripheral surface $1a$ and the second side surface $1d$. In a cross section shown in FIG. 2B, a center of gravity G of the side rail 1 is located on the center line L and to be closer to an inner peripheral surface $1b$ side than to a center position in a thickness direction of the side rail 1.

As shown in FIG. 2A, the side rail 1 has an annular shape, and for example, an outer diameter $R_O$ is 60 to 120 mm, and an inner diameter $R_I$ is 56 to 114 mm A thickness T $(=(R_O-R_I)/2)$ of the side rail 1 is, for example, 1.0 to 3.0 mm, and may be 1.2 to 2.7 mm or 1.4 to 2.5 mm A height h0 of the side rail 1 is, for example, 0.2 to 0.7 mm, and may be 0.25 to 0.55 mm or 0.30 to 0.45 mm Incidentally, the "annular shape" referred to here does not necessarily mean a closed circle, and the side rail 1 may include an abutment portion. In addition, the side rail 1 may have a perfect circular shape or an elliptical shape in a plan view.

Figure 3:
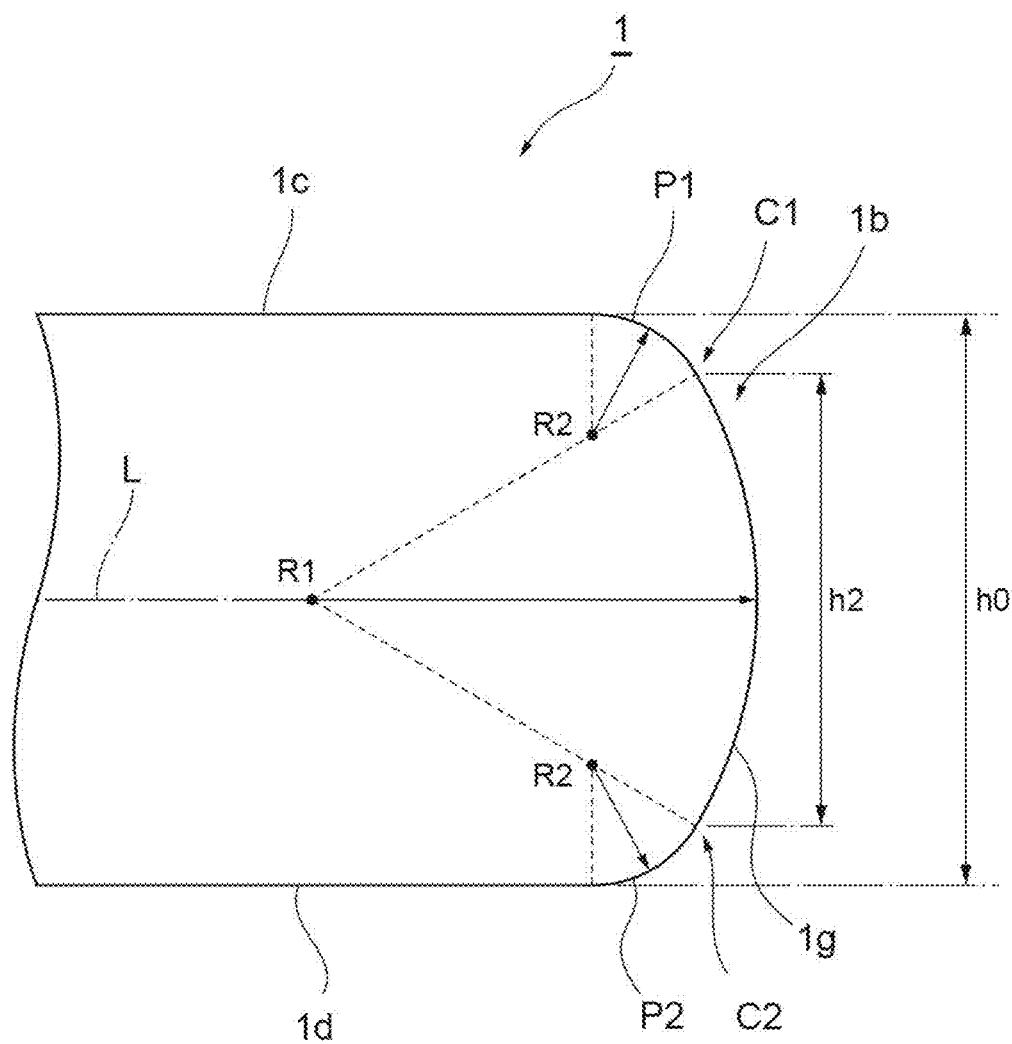
FIG. 3 is an enlarged cross-sectional view showing an inner peripheral side of the side rail shown in FIG. 2.

FIG. 3 is an enlarged cross-sectional view showing an inner peripheral side of the side rail 1. As shown in FIG. 3, the inner peripheral surface $1b$ of the side rail 1 includes an inner tip portion $1g$ located at a central portion in a height direction of the side rail 1 in an axial cross section. The inner tip portion $1g$ satisfies the following Condition 1.

$0.7 \leq R1/h0 \leq 1.1$         Condition 1:

In the expression, R1 represents a curvature radius (unit mm) of a curve forming the inner tip portion $1g$, and h0 represents a height (unit: mm) of the side rail. By setting the value of R1/h0 within a range of 0.7 to 1.1, even when the average speed of the reciprocation of the piston is higher than 20 m/s, an increase in oil consumption amount can be sufficiently suppressed.

A ratio h2/h0 of a height h2 (height h2 in FIG. 3) of the inner tip portion 1g to the height h0 of the side rail 1 may be 1 or less, preferably 0.5 to 0.75 and may be 0.5 to 0.7 or 0.5 to 0.65. In the present embodiment, the height h2 means a distance from one inflection point (the apex of a convex curved portion C1) to the other inflection point (the apex of a convex curved portion C2) in an axial cross section (refer to FIG. 3). By setting the value of h2/h0 within the above-mentioned range, even when the average speed of the reciprocation of the piston is higher than 20 m/s, an increase in oil consumption amount can be even more reliably suppressed.

As shown in FIG. 3, the inner peripheral surface 1b may further include peripheral edge portions P1 and P2 located to interpose the inner tip portion 1g therebetween. It is preferable that the convex curved portion C1 is formed by the inner tip portion 1g and the peripheral edge portion P1 and the convex curved portion C2 is formed by the inner tip portion 1g and the peripheral edge portion P2. It is preferable that the peripheral edge portions P1 and P2 satisfy the following Condition 2.

$$0.2 \leq R2/h0 \leq 0.5 \quad \text{Condition 2:}$$

In the expression, R2 represents a curvature radius (unit mm) of curves forming the peripheral edge portions P1 and P2, and h0 represents the height (unit: mm) of the side rail. By setting the value of R2/h0 within a range of 0.2 to 0.5, even when the average speed of the reciprocation of the piston is higher than 20 m/s, an increase in oil consumption amount can be sufficiently suppressed.

Figure 4:
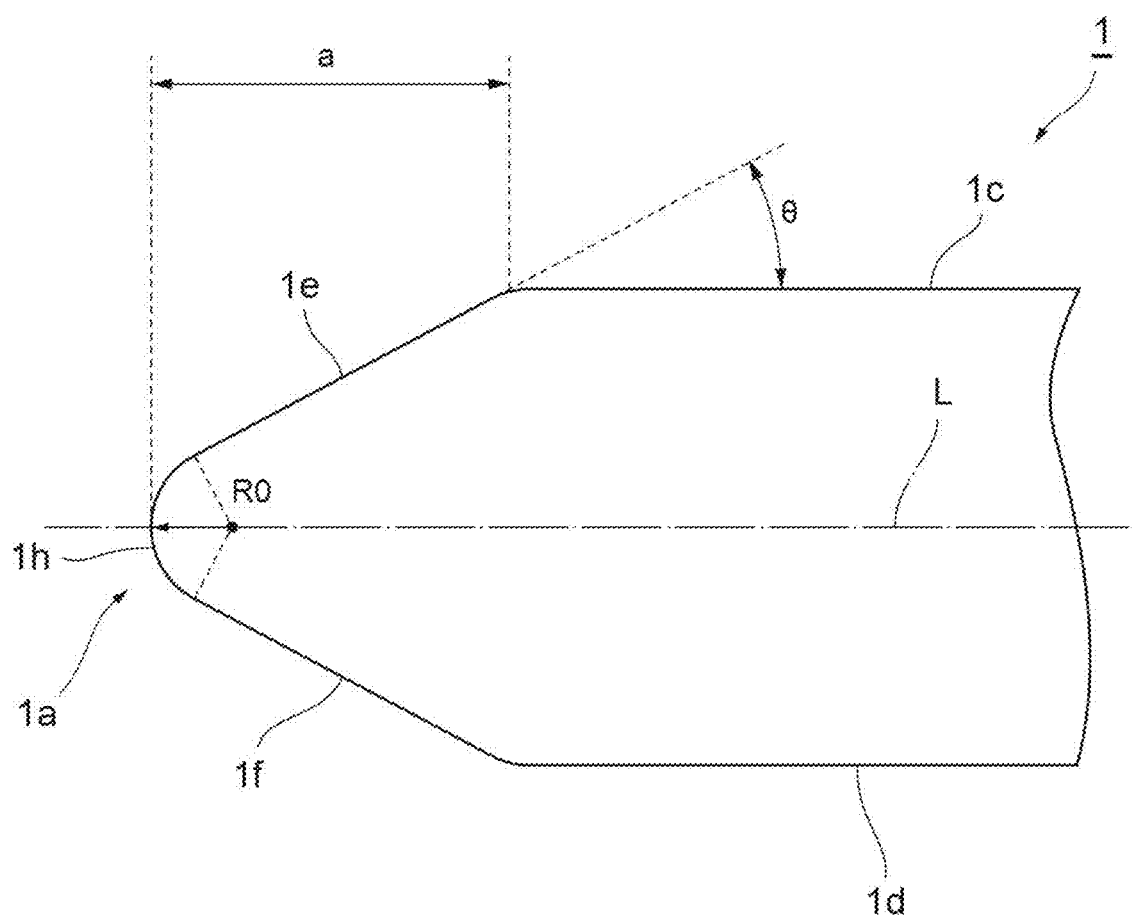
FIG. 4 is an enlarged cross-sectional view showing an outer peripheral side of the side rail shown in FIG. 2.

FIG. 4 is an enlarged cross-sectional view showing an outer peripheral side of the side rail 1. As shown in FIG. 4, it is preferable that the outer peripheral surface 1a of the side rail 1 includes an outer tip portion 1h satisfying the following Condition 3 in an axial cross section.

$$0.1 \leq R0/h0 \leq 0.23 \quad \text{Condition 3:}$$

In the expression, R0 represents a curvature radius (unit mm) of a curve forming the outer tip portion 1h, and h0 represents the height (unit: mm) of the side rail 1.

It is preferable that an angle θ of the first and second inclined surfaces 1e and 1f is 30° to 50°. Incidentally, the angle θ means an angle formed by a plane orthogonal to the axial direction and the inclined surfaces 1e and 1f. It is preferable that in an axial cross section, a distance a (unit: mm) in a radial direction from a tip of the outer peripheral surface 1a to a boundary between the side surface 1c and the inclined surface 1e satisfies the following Condition 4.

$$0.1 \leq a/T \leq 0.2 \quad \text{Condition 4:}$$

In the expression, T represents a thickness (unit: mm) of the side rail 1 in an axial cross section (refer to FIG. 2B).

[Spacer Expander]

Figure 5:
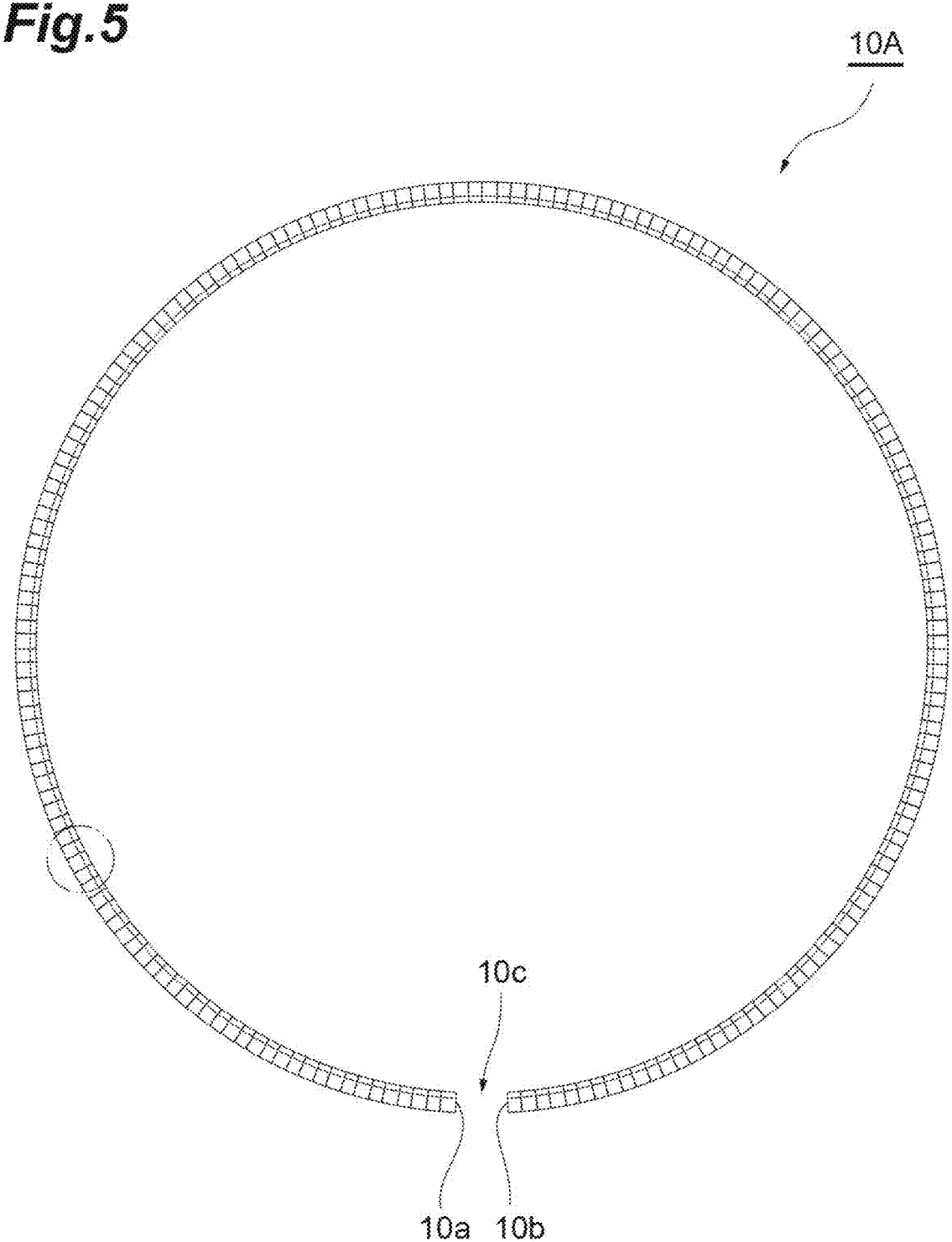
FIG. 5 is a plan view showing a first example of a spacer expander shown in FIG. 1.
Figure 6:
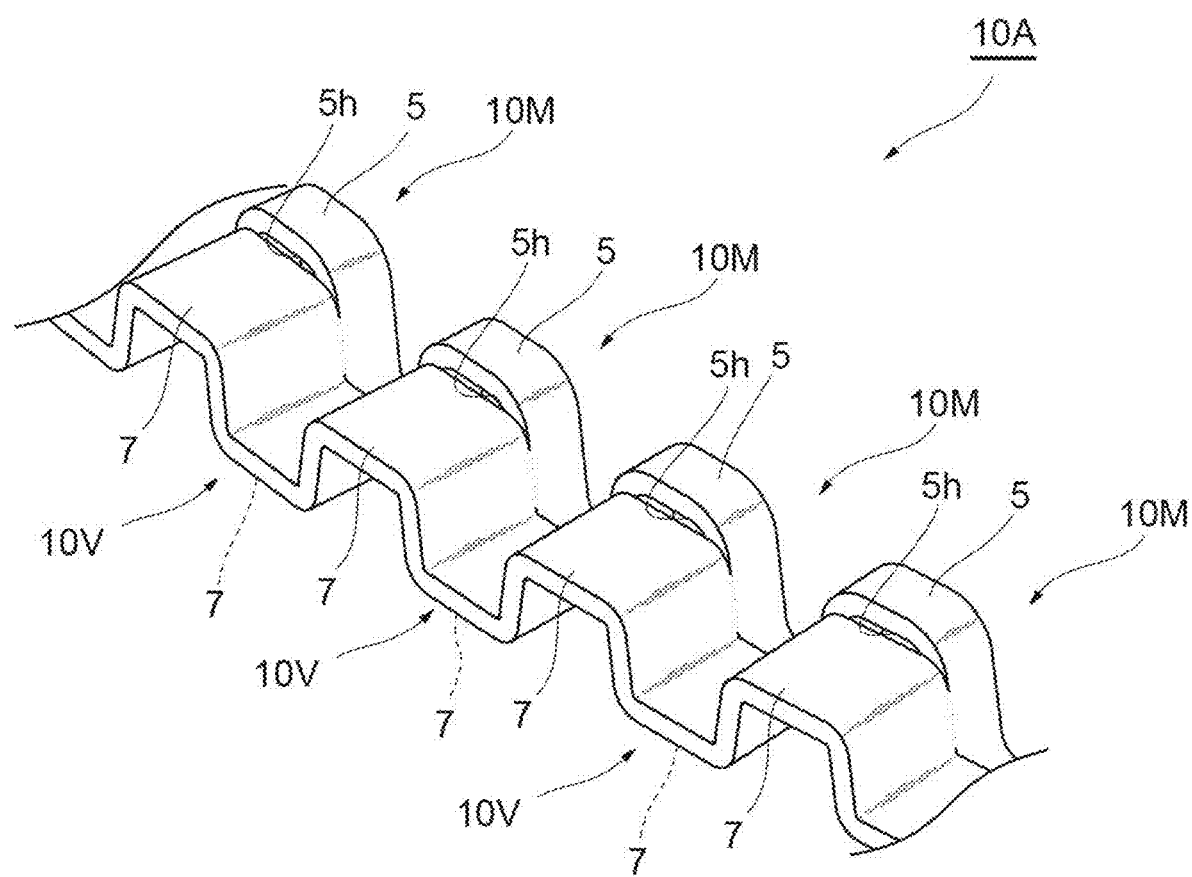
FIG. 6 is an enlarged perspective view showing a region surrounded by an alternating long and short dashed line as shown in FIG. 5.

FIG. 5 is a plan view of the spacer expander 10A. As shown in this figure, the spacer expander 10A has an annular shape, and includes an abutment portion 10c formed by two end surfaces 10a and 10b. The spacer expander 10A is manufactured, for example, by pressing (cutting, bending, and punching) a steel sheet or by plastically deforming a wire rod made of spring steel while meshing the wire rod with a plurality of gears. FIG. 6 is an enlarged perspective view showing a region surrounded by an alternating long and short dashed line as shown in FIG. 5.

The spacer expander 10A may be subjected to surface treatment from the viewpoint of improving wear resistance, adhesion resistance, and the like. For example, a film may be formed on a surface of the spacer expander 10A by non-electrolytic plating, electrolytic plating, hard paint coating, physical vapor deposition (PVD), chemical vapor deposition (CVD), and sputtering. Examples of the material of the film include amorphous carbon, chromium nitride (CrN), titanium nitride (TiN), titanium carbide (TiC), aluminum titanium nitride (TiAlN), chromium nitride (CrN), TiCN, AlCrN, TiC, nickel (Ni), and a plating made of nickel alloy such as nickel phosphorous (NiP). In addition, a polymer coating made of polyimide or the like other than a coating made of an inorganic material may be formed. Incidentally, a filler such as carbon fiber or glass fiber may be mixed in the polymer coating.

A thickness of a portion indicated by hatching in FIG. 1 (sheet thickness of the spacer expander) is, for example, 0.1 mm to 0.7 mm. By making the portion as thick as possible, higher tension can be obtained and a contact area with the side rails 1 and 2 can be ensured, so that a better wear reduction effect is obtained.

The spacer expander 10A includes a plurality of the respective ear portions 5 against which the inner peripheral surfaces 1b and 2b of the side rails 1 and 2 abut, and a plurality of rail facing portions 7 facing the respective side surfaces 1d and 2c of the side rails 1 and 2 (refer to FIG. 6). The rail facing portions 7 are formed at positions closer to the outer peripheral side than to the ear portions 5 and adjacent to the ear portions 5. The ear portions 5 are formed to be higher than the rail facing portions 7. The spacer expander 10A includes openings 5h formed by the ear portions 5 and the rail facing portions 7.

Surfaces of the ear portions 5 against which the side rails 1 and 2 abut are inclined with respect to the axial direction. An inclination angle α shown in FIG. 1 is preferably 5° to 30°, more preferably 10° to 25°.

The spacer expander 10A has, for example, a shape in which ridge portions 10M and valley portions 10V are alternately connected to each other when placed on a workbench. In the present embodiment, the ear portions 5 located at the ridge portions 10M (upper side in FIG. 6) of the spacer expander 10A and the ear portions 5 located at the valley portions 10V (lower side in FIG. 6) have substantially the same shape. In addition, the rail facing portions 7 located at the ridge portions 10M (upper side in FIG. 6) of the spacer expander 10A and the rail facing portions 7 located at the valley portions 10V (lower side in FIG. 6) have substantially the same shape. Therefore, when the spacer expander 10A placed on the workbench is turned upside down, the ridge portions 10M shown in FIG. 6 become the valley portions 10V, and the valley portions 10V become the ridge portions 10M.

As shown in FIG. 6, the rail facing portions 7 according to the present embodiment are formed of flat surfaces. The side rails 1 and 2 abut against the flat surfaces, thereby supporting the side rails 1 and 2.

Figure 7:
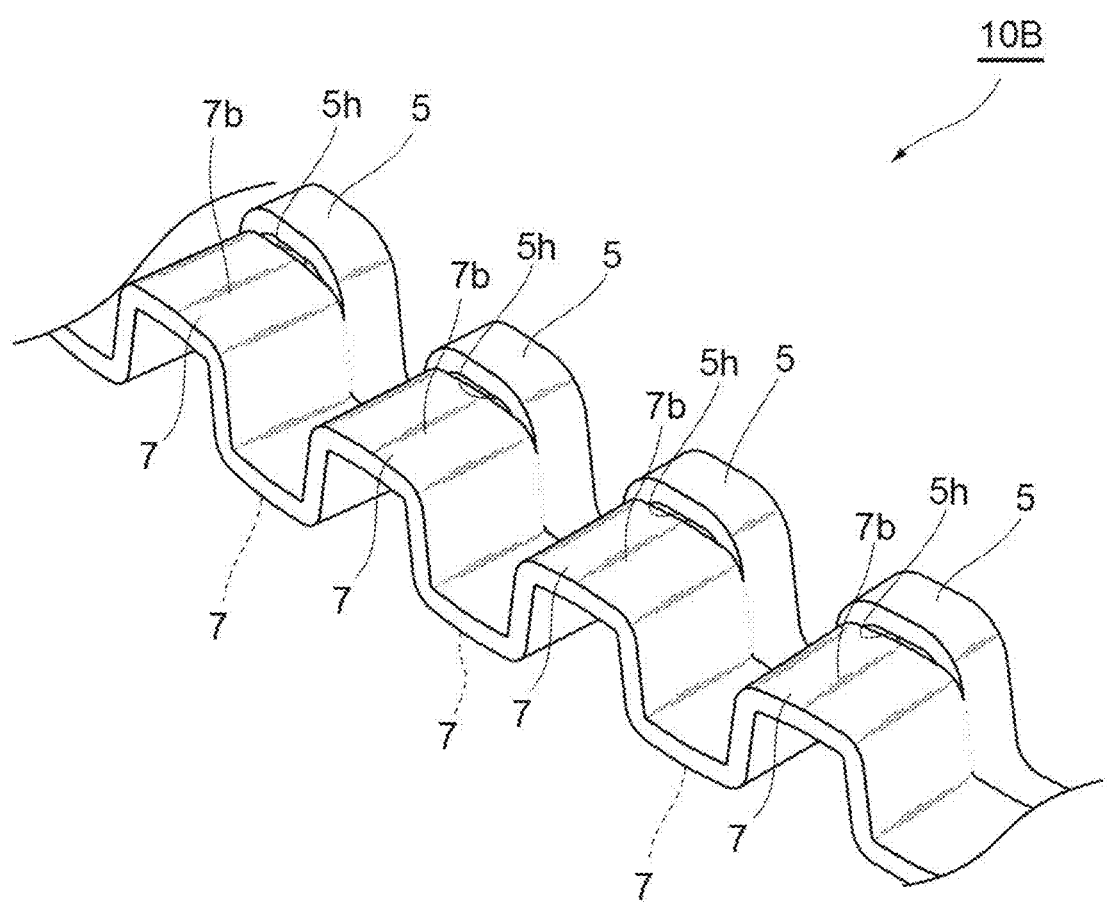
FIG. 7 is a partial perspective view showing a second example of the spacer expander.

FIG. 7 is a partial perspective view showing a second example of the spacer expander. A spacer expander 10B shown in this figure has the same configuration as the spacer expander 10A except that the rail facing portions 7 include raised portions 7b formed to extend in the radial direction, instead of having flat surfaces. Since the rail facing portions 7 include the raised portions 7b, the accumulation of engine oil or foreign matter contained therein on surfaces of the rail facing portions 7 can be sufficiently suppressed, and sticking between the rail facing portions 7 and the side rails 1 and 2 can be sufficiently suppressed. The raised portions 7b extend to an end portion on the outer peripheral side of the spacer expander 10B.

Figure 8:
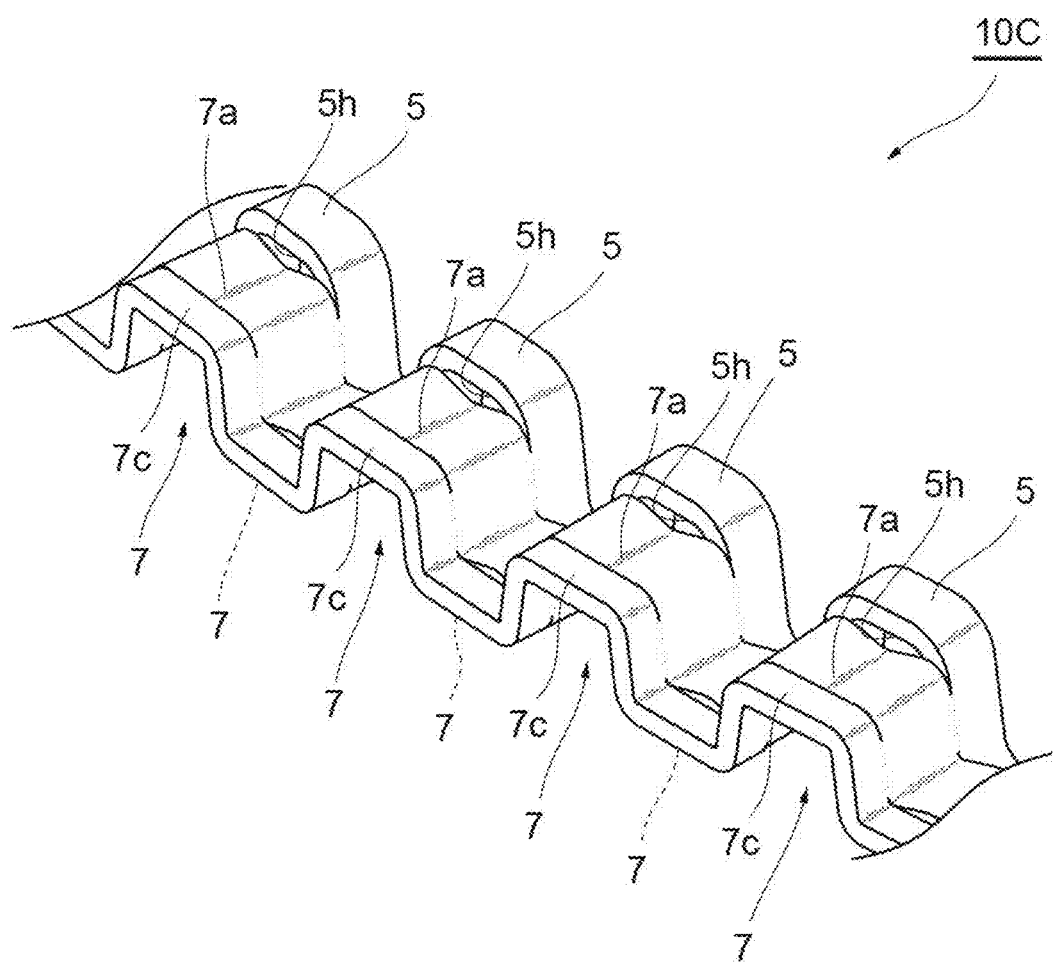
FIG. 8 is a partial perspective view showing a third example of the spacer expander.

FIG. 8 is a partial perspective view showing a third example of the spacer expander. A spacer expander 10C shown in this figure has the same configuration as the spacer expander 10A except that the rail facing portions 7 include flat portions 7c on the outer peripheral side and include depressions 7a formed to extend in the radial direction between the ear portions 5 and the flat portions 7c, instead of having flat surfaces. By adopting such a configuration, the accumulation of combustion by-products such as sludge between the rail facing portions 7 and the side rails 1 and 2 can be prevented. In addition, such a configuration also contributes to suppressing sticking. A depth of the depressions 7a (height difference between a highest position of the rail facing portions 7 and a lowest position of the depressions 7a) is, for example, 50 to 500 μm. The flat portions 7c are formed along an edge portion on the outer peripheral side of the spacer expander 10C. By forming the height of the flat portions 7c to be lower than the ear portions 5 and to be higher than other portions of the rail facing portions 7, gaps are formed between the other portions of the rail facing portions 7 and the side rail 1 in a state where the side rail 1 abuts against the flat portions 7c. Incidentally, the flat portion 7c is also referred to as a "projection portion", and a region of the rail facing portion 7 other than the flat portion 7c (portion connecting the ear portion 5 and the flat portion 7c) is also referred to as an "intermediate portion". The rail facing portions 7 include the flat portions 7c, thereby obtaining the effect that spaces are formed between the side surfaces of the side rails 1 and 2 and the spacer expander 10C, and that the oil scraped off from the cylinder bore by the side rails 1 and 2 can be scraped off to gaps between the ear portions 5 and the rail facing portions 7 and can efficiently flow to the inner peripheral side of the spacer expander 10C.

Figure 9A:
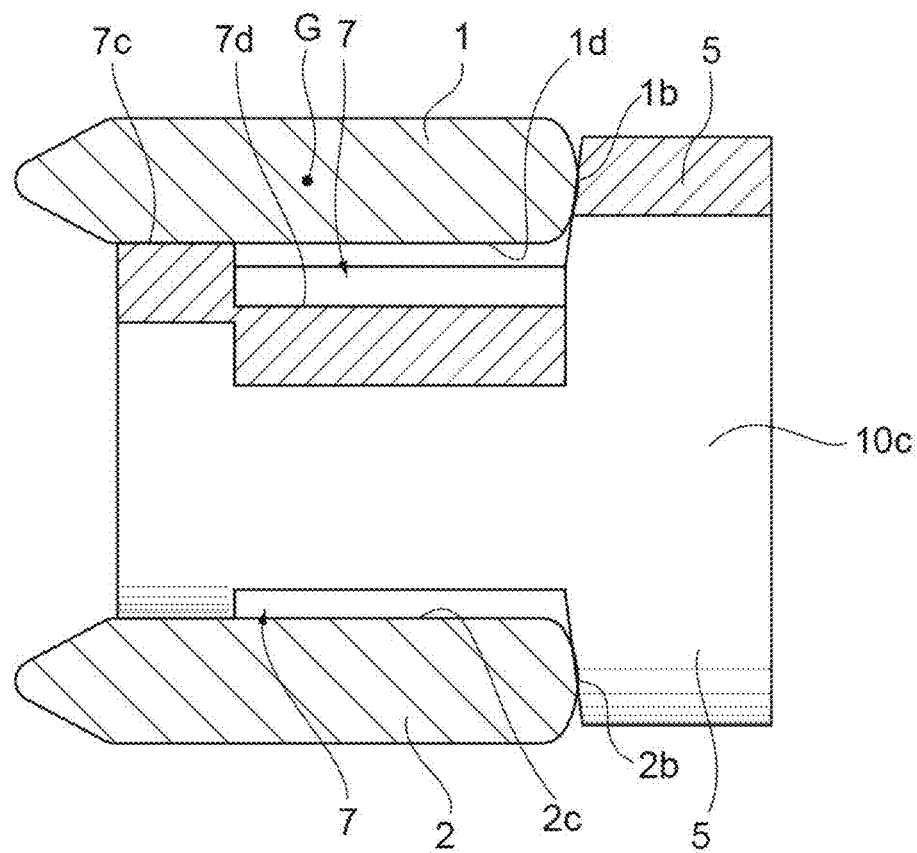
FIGS. 9A and 9B are cross-sectional views of the spacer expander shown in FIG. 8 and the side rails mounted thereon, and are cross-sectional views showing different forms of the spacer expander.
Figure 9B:
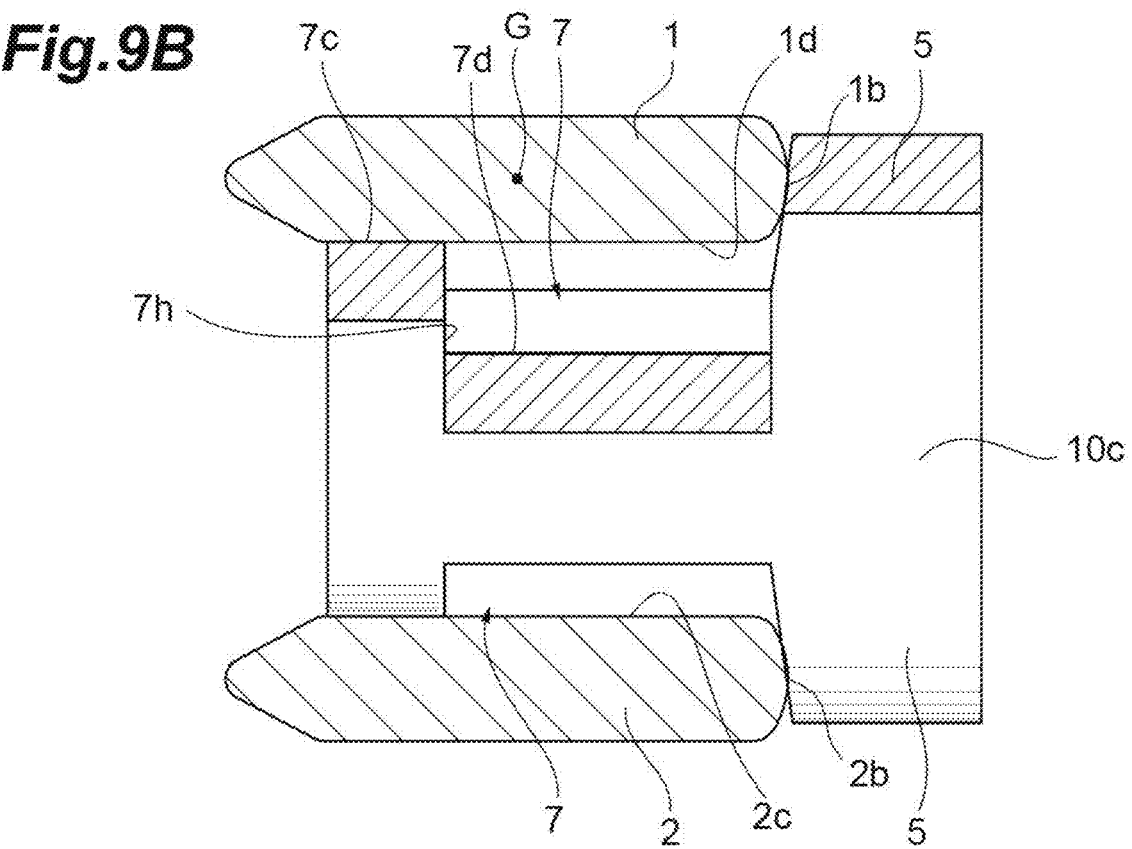

FIGS. 9A and 9B are cross-sectional views of the spacer expander 10C shown in FIG. 8 and the side rails 1 and 2 mounted thereon, and show different forms. In both the forms, a step is provided between the flat portion 7c and the other region 7d (intermediate portion) in each of the rail facing portions 7. In the form shown in FIG. 9A, a portion between the flat portion 7c and the other region 7d in the rail facing portion 7 is not cut off, and the member is continuous. Namely, a through-hole is not formed at this portion. In contrast, in the form shown in FIG. 9B, a portion between the flat portion 7c and the other region 7d in the rail facing portion 7 is cut off, and a through-hole 7h is formed at this portion. The through-hole 7h may or may not be formed; however, in the case of use in an environment such as inside a diesel engine where foreign matter is likely to exist, there may be a risk of the through-hole 7h being blocked by the foreign matter, and the degree of deterioration of the tension over time may be increased by providing the through-hole 7h. In a case where there are these concerns due to the environment of an internal combustion engine, as shown in FIG. 9A, it is preferable that a spacer expander in which the through-holes 7h are formed is used. On the other hand, by providing the through-hole 7h, an opportunity that the oil scraped off from the cylinder bore can efficiently flow to the inner peripheral side of a spacer expander 10D is increased. Incidentally, the through-hole 7h may be, for example, formed by a deepest portion of the depression 7a and the flat portion 7c.

In the cross sections shown in FIGS. 9A and 9B, it is preferable that the centers of gravity G of the side rails 1 and 2 are located closer to the inside than the flat portion 7c. By adopting such a configuration, the behavior of the side rails 1 and 2 during high-speed operation is stabilized, and accordingly, an increase in oil consumption amount can be even more effectively suppressed.

Figure 10:
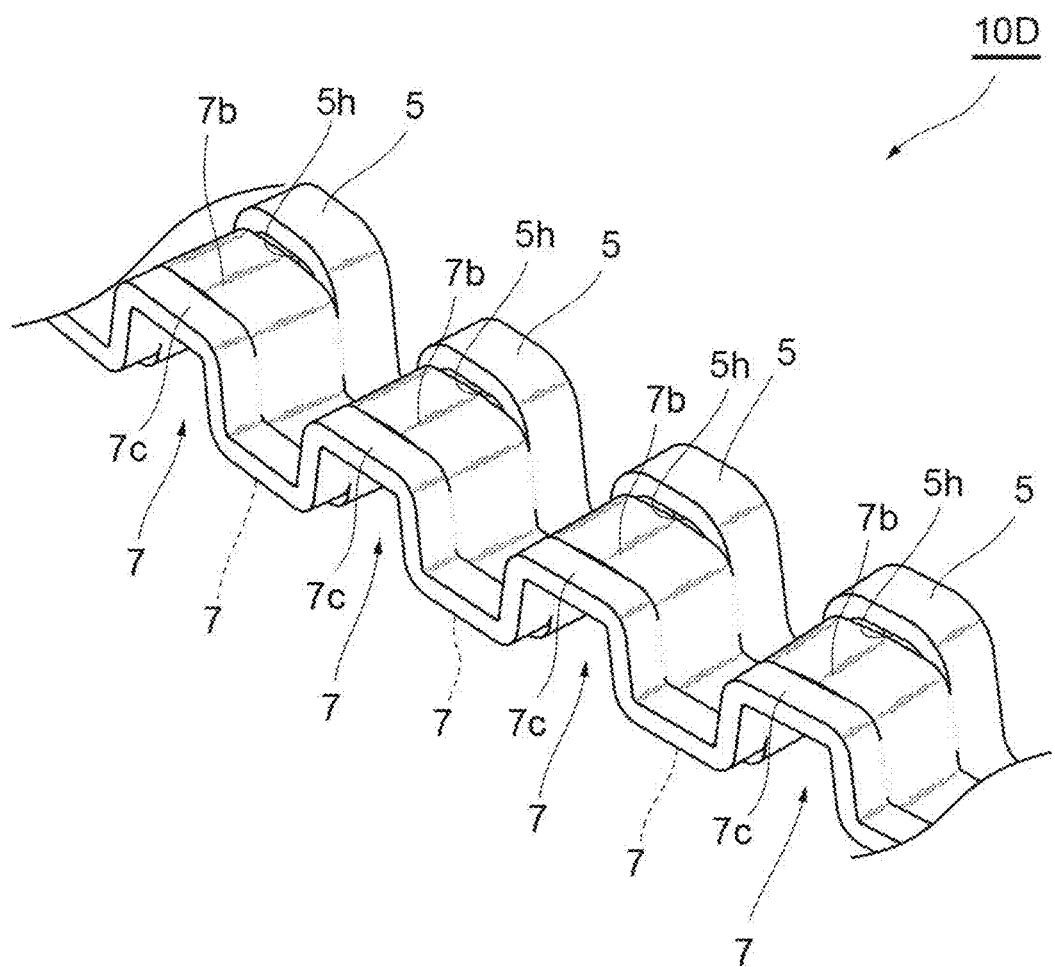
FIG. 10 is a partial perspective view showing a fourth example of the spacer expander according to the present disclosure.

FIG. 10 is a partial perspective view showing a fourth example of the spacer expander. The spacer expander 10D shown in this figure has the same configuration as the spacer expander 10A except that the rail facing portions 7 include the flat portions 7c on the outer peripheral side and include the raised portions 7b formed to extend in the radial direction between the ear portions 5 and the flat portions 7c, instead of having flat surfaces. The flat portions 7c are formed along an edge portion on the outer peripheral side of the spacer expander 10D. In a state where the side rails 1 and 2 are combined with the spacer expander 10D, since the inner peripheral surfaces 1b and 2b of the side rails 1 and 2 abut against the ear portions 5 and the side surfaces 1d and 2c of the side rails 1 and 2 face the flat portions 7c of the rail facing portions 7, the flat portions 7c are formed to be lower than the ear portions 5.

Figure 11:
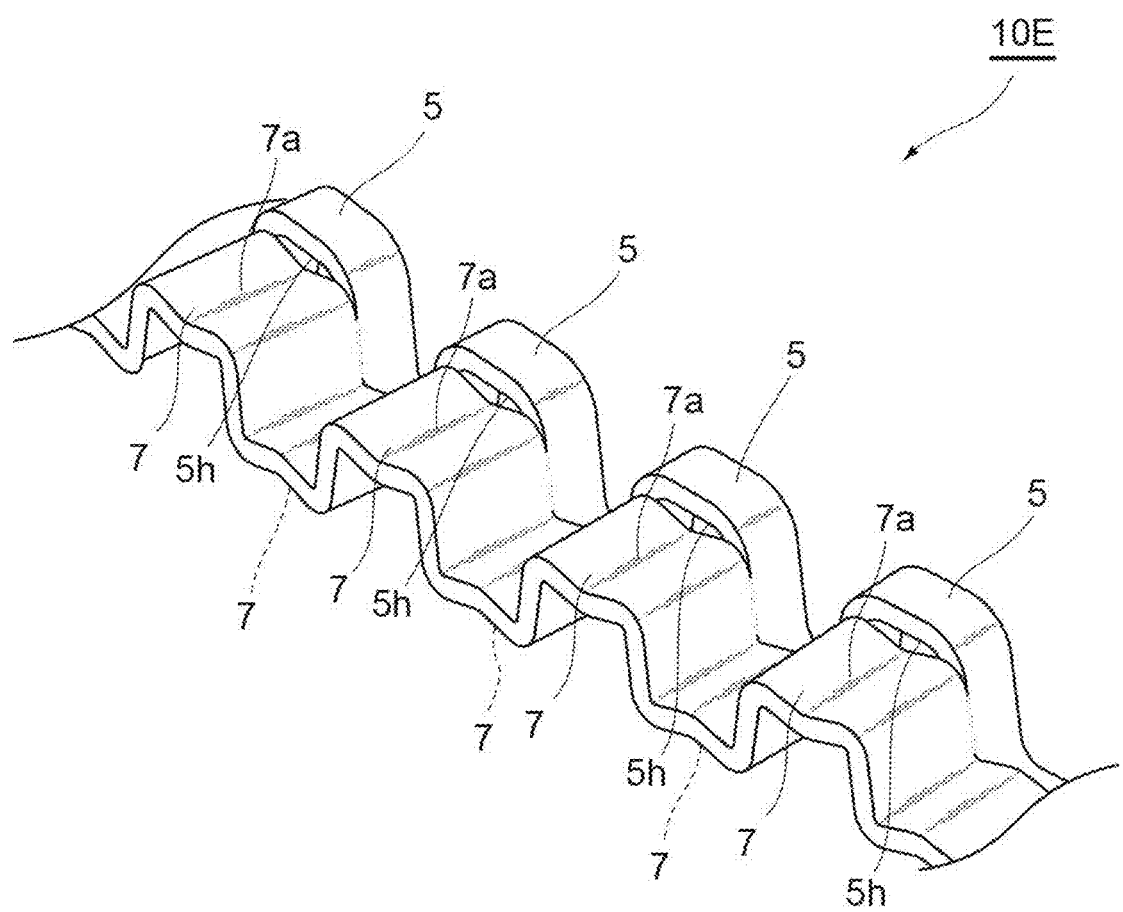
FIG. 11 is a partial perspective view showing a fifth example of the spacer expander according to the present disclosure.

FIG. 11 is a partial perspective view showing a fifth example of the spacer expander. A spacer expander 10E shown in this figure has the same configuration as the spacer expander 10A according to a first example except that the rail facing portions 7 include the depressions 7a extending in the radial direction, instead of the rail facing portions 7 having flat surfaces. The depressions 7a extend to an end portion on the outer peripheral side of the spacer expander 10E. The spacer expander 10E with such a configuration is more easily processed by plastic deformation compared to the spacer expanders described above, which is a merit.

Figure 12:
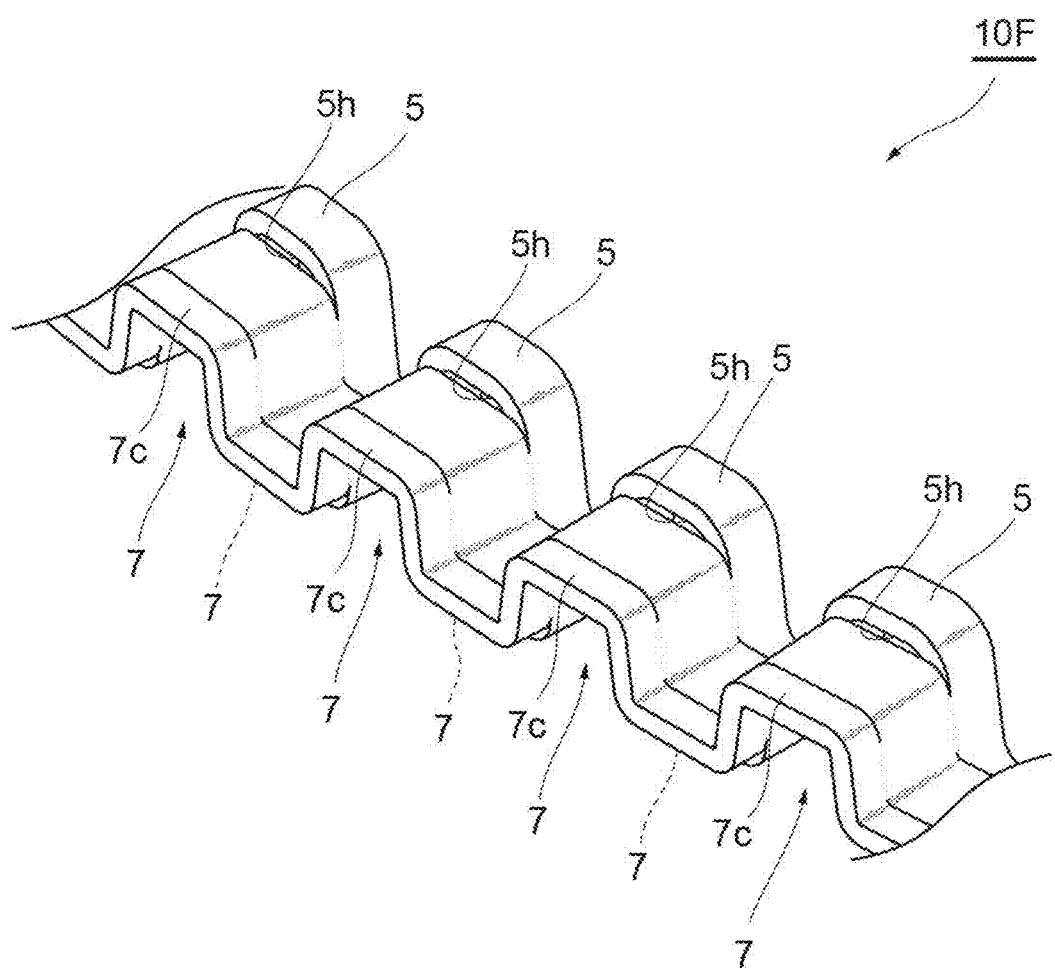
FIG. 12 is a partial perspective view showing a sixth example of the spacer expander according to the present disclosure.
Figure 13:
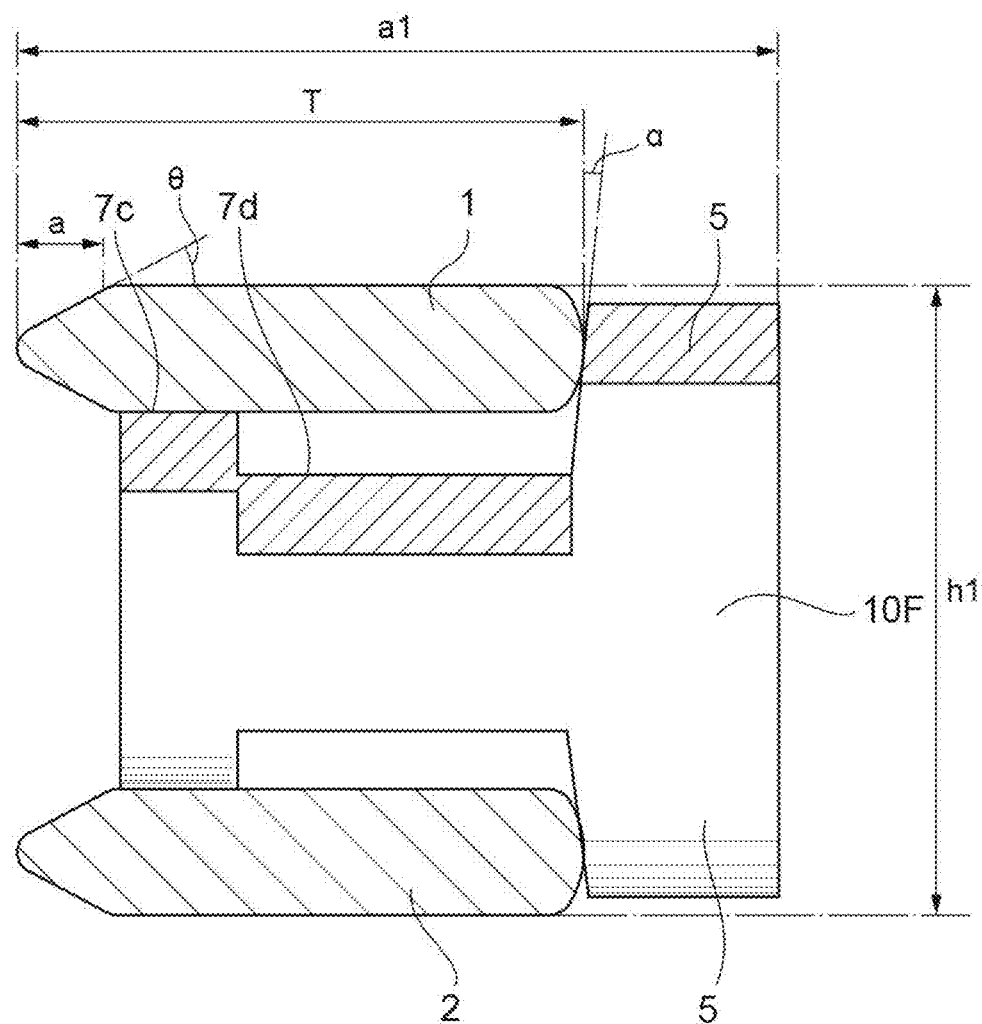
FIG. 13 is a schematic cross-sectional view showing the spacer expander shown in FIG. 12 and the side rails mounted thereon.

FIG. 12 is a partial perspective view showing a sixth example of the spacer expander. A spacer expander 10F shown in this figure has the same configuration as the spacer expander 10A except that the rail facing portions 7 include the flat portions 7c on the outer peripheral side instead of having flat surfaces. Similarly to the spacer expander according to a fifth example described above, the spacer expander 10F with such a configuration is easily processed by plastic deformation, which is a merit. FIG. 13 is a schematic cross-sectional view showing the spacer expander 10F and the side rails 1 and 2 mounted thereon.

Figure 14:
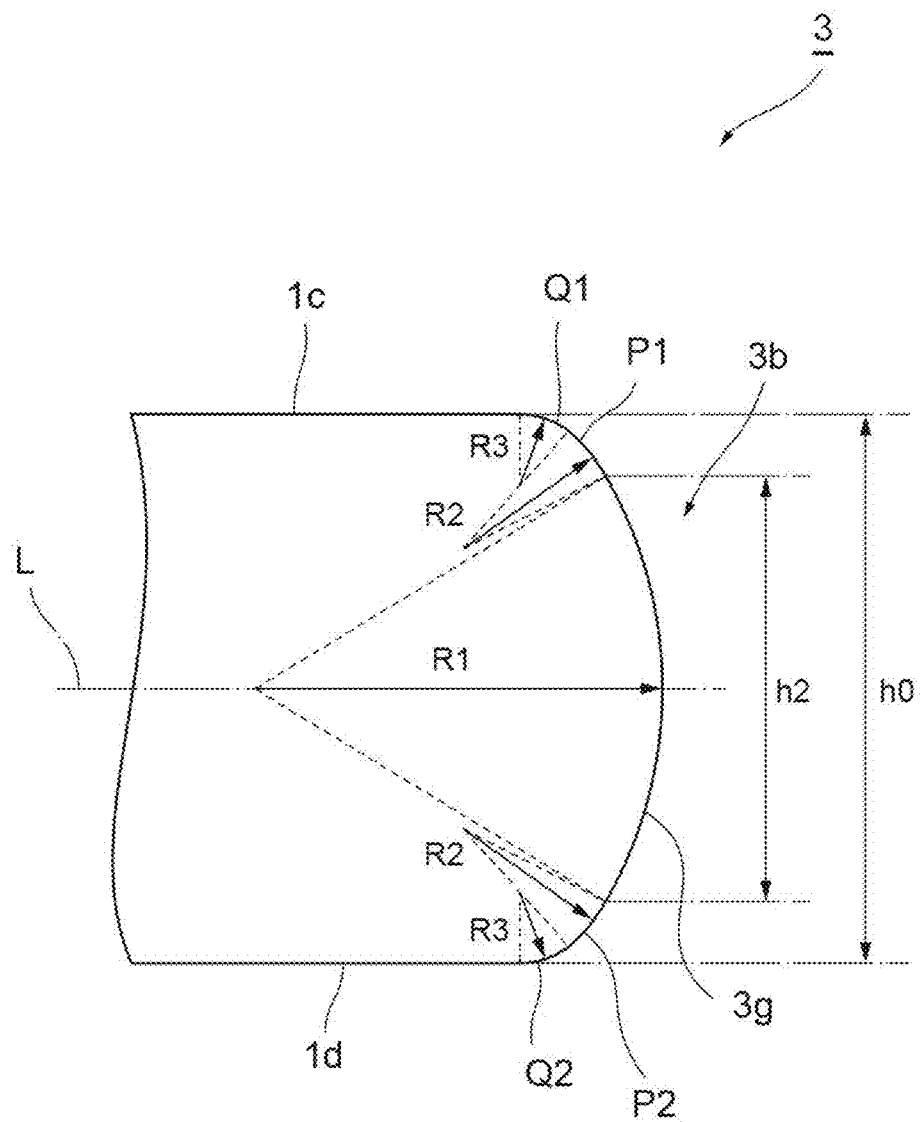
FIG. 14 is an enlarged cross-sectional view showing another example of an inner peripheral surface of the side rail.

The embodiment of the present disclosure has been described above in detail, but the present invention is not limited to the embodiment. For example, in the embodiment, the case in which the inner peripheral surface of the side rail 1 is formed of two arcs with different curvature radii in an axial cross section has been provided as an example; however, the inner peripheral surface of the side rail may be formed of three or more arcs with different curvature radii in an axial cross section. A side rail 3 shown in FIG. 14 is formed of three arcs with different curvature radii. Namely, an inner peripheral surface 3b of the side rail 3 is formed of an inner tip portion 3g with the curvature radius R1, first peripheral edge portions P1 and P2 with the curvature radius R2 formed to interpose the inner tip portion 3g therebetween, and second peripheral edge portions Q1 and Q2 with the curvature radius R3 formed outside the first peripheral edge portions P1 and P2. It is preferable that the inner peripheral surface 3b satisfies the following conditions. Incidentally, in the expressions, h0 represents a height of the side rail 3, and h2 represents a height (height h2 in FIG. 14)

of the inner tip portion (portion with the curvature radius R1).

$$0.7 \leq R1/h0 \leq 1.1 \quad \text{Condition 1a:}$$

$$0.2 \leq R2/h0 \leq 0.5 \quad \text{Condition 2a:}$$

$$h2/h0 \leq 1.0 \quad \text{Condition 3a:}$$

The value of ratio h2/h0 according to Condition 3a is more preferably 0.5 to 0.75, further preferably 0.5 to 0.7, and may be 0.5 to 0.65. Incidentally, as shown in FIG. 14, h2 means the height of the inner tip portion 3g (distance from one inflection point to the other inflection point) in an axial cross section. By setting the value of h2/h0 within the above-mentioned range, even when the average speed of the reciprocation of the piston is higher than 20 m/s, an increase in oil consumption amount can be even more reliably suppressed.

Figure 15:
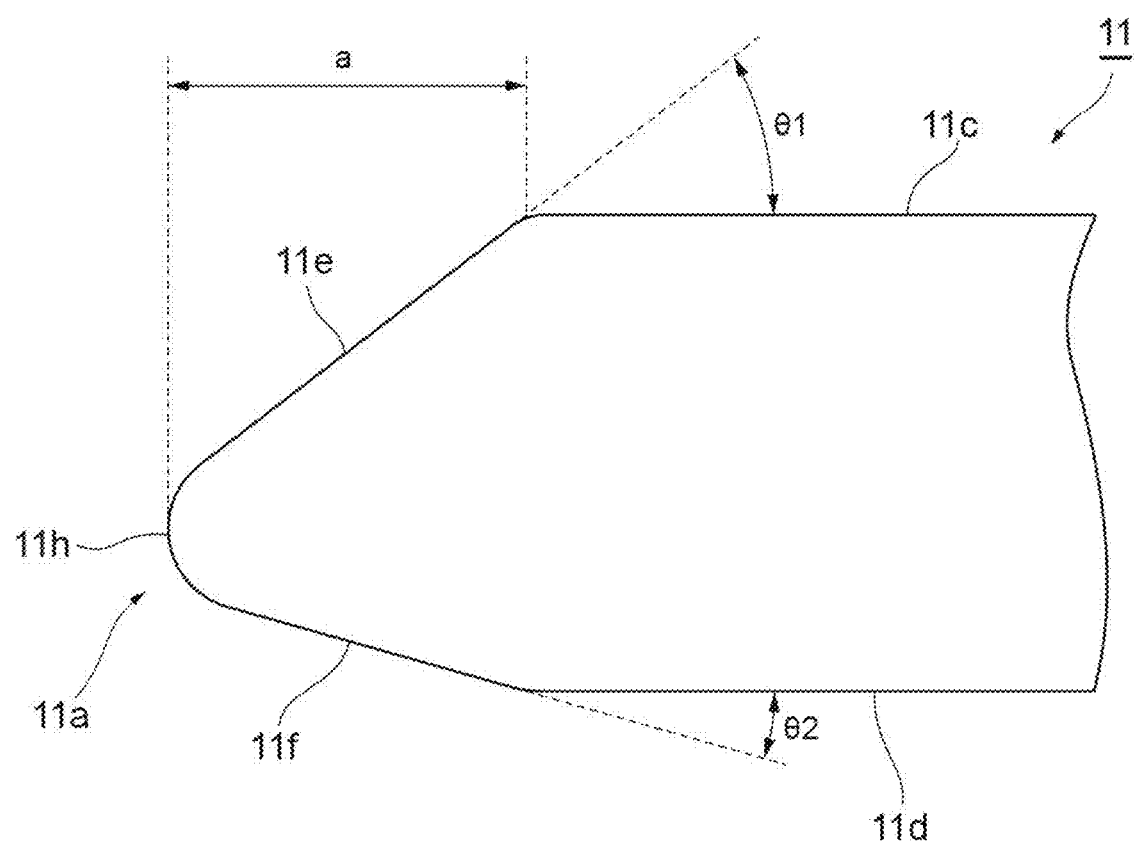
FIG. 15 is an enlarged cross-sectional view showing an outer peripheral side of a side rail according to another embodiment.
Figure 16A:
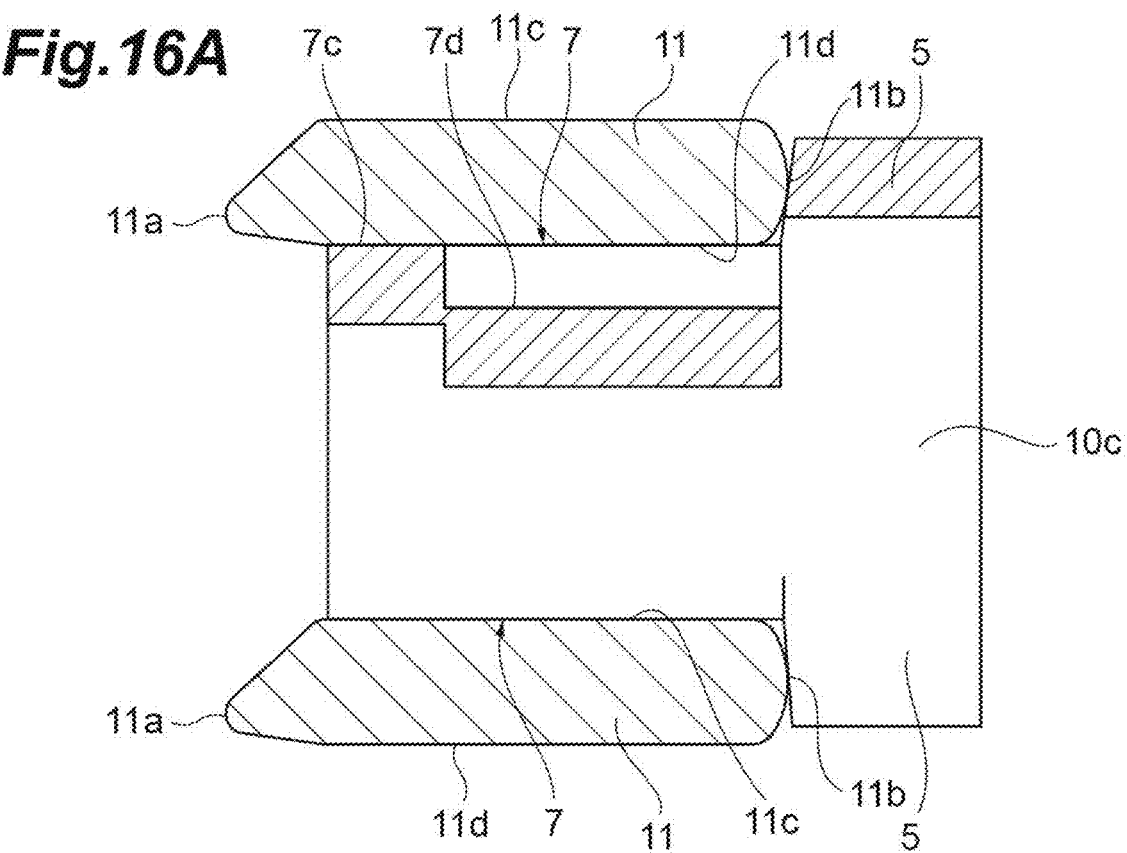
FIGS. 16A and 16B are cross-sectional views of the spacer expander shown in FIG. 8 and the side rails mounted thereon as shown in FIG. 15, and are cross-sectional views showing different forms of the spacer expander.
Figure 16B:
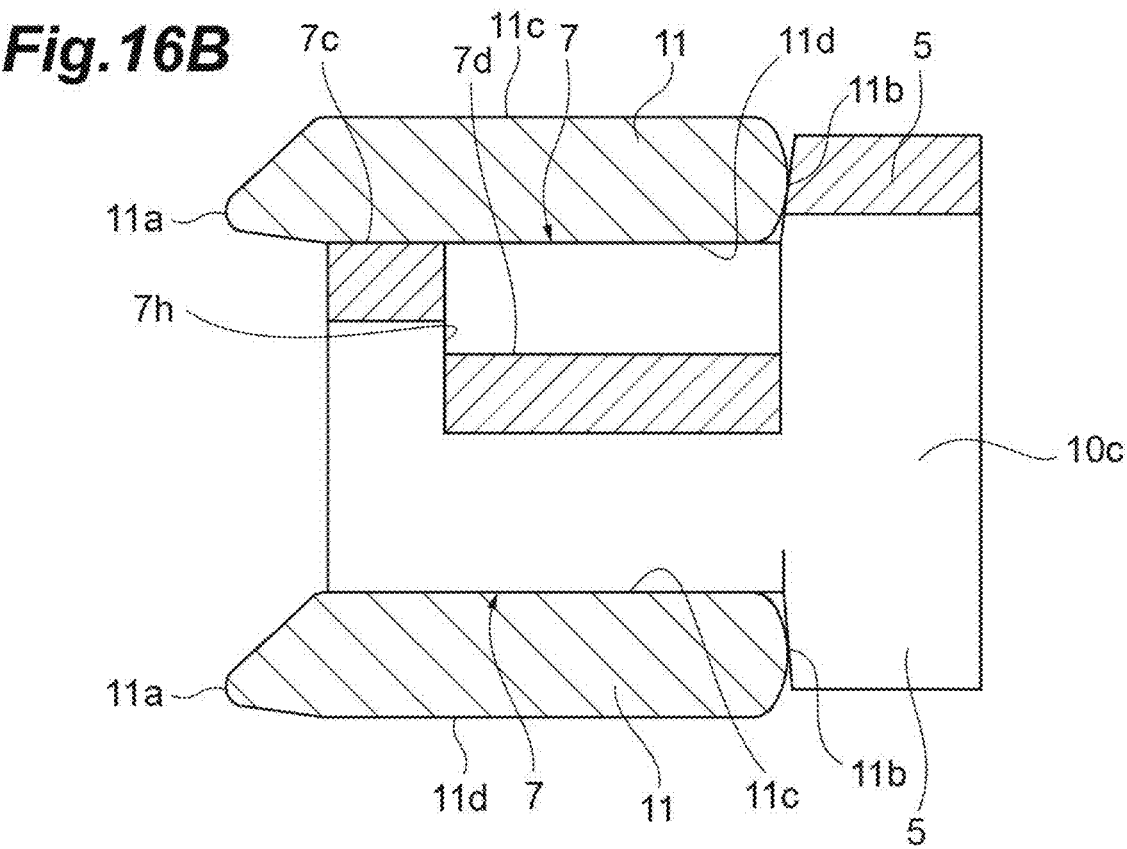
Figure 17:
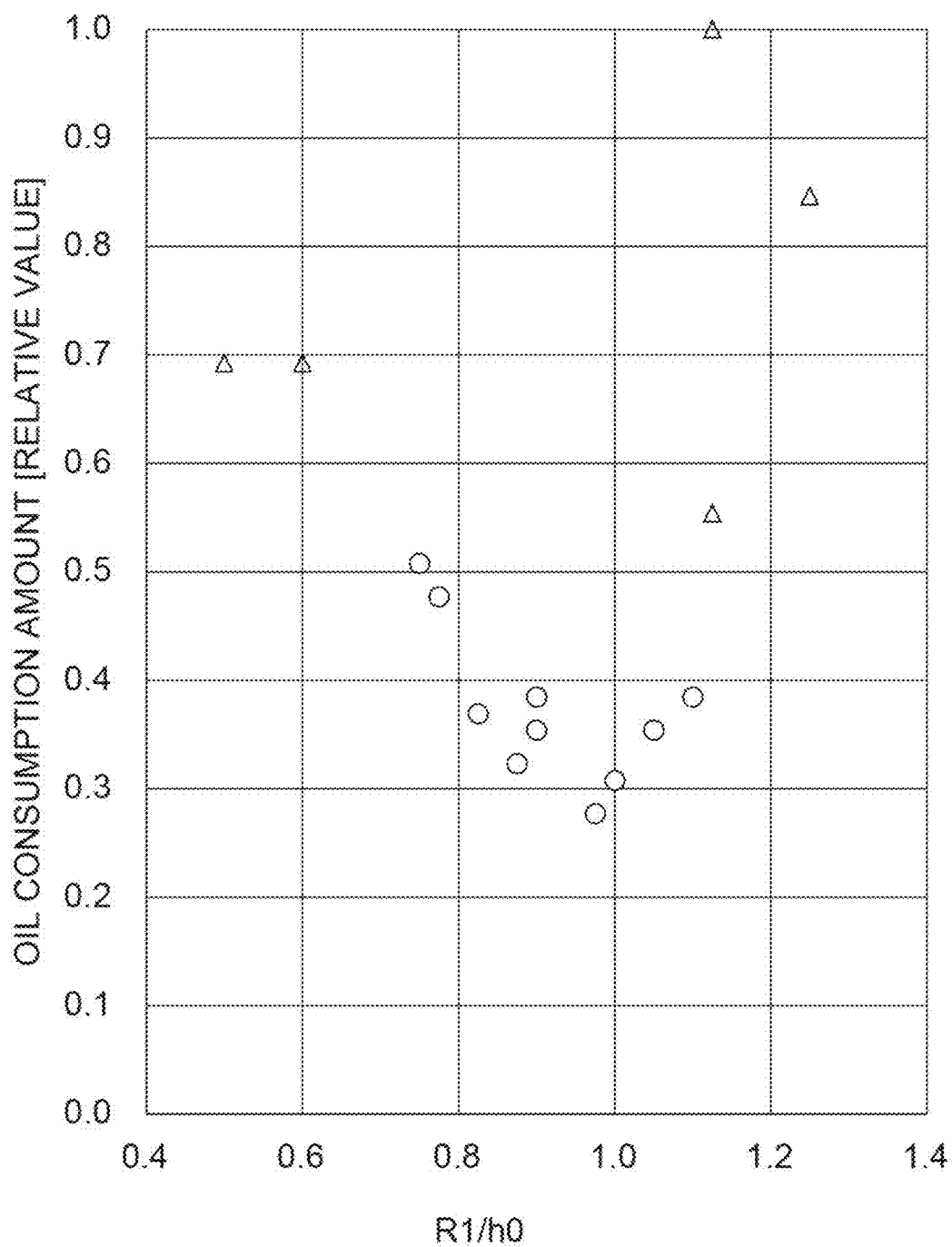
FIG. 17 is a graph plotting results of examples and comparative examples.
Figure 18:
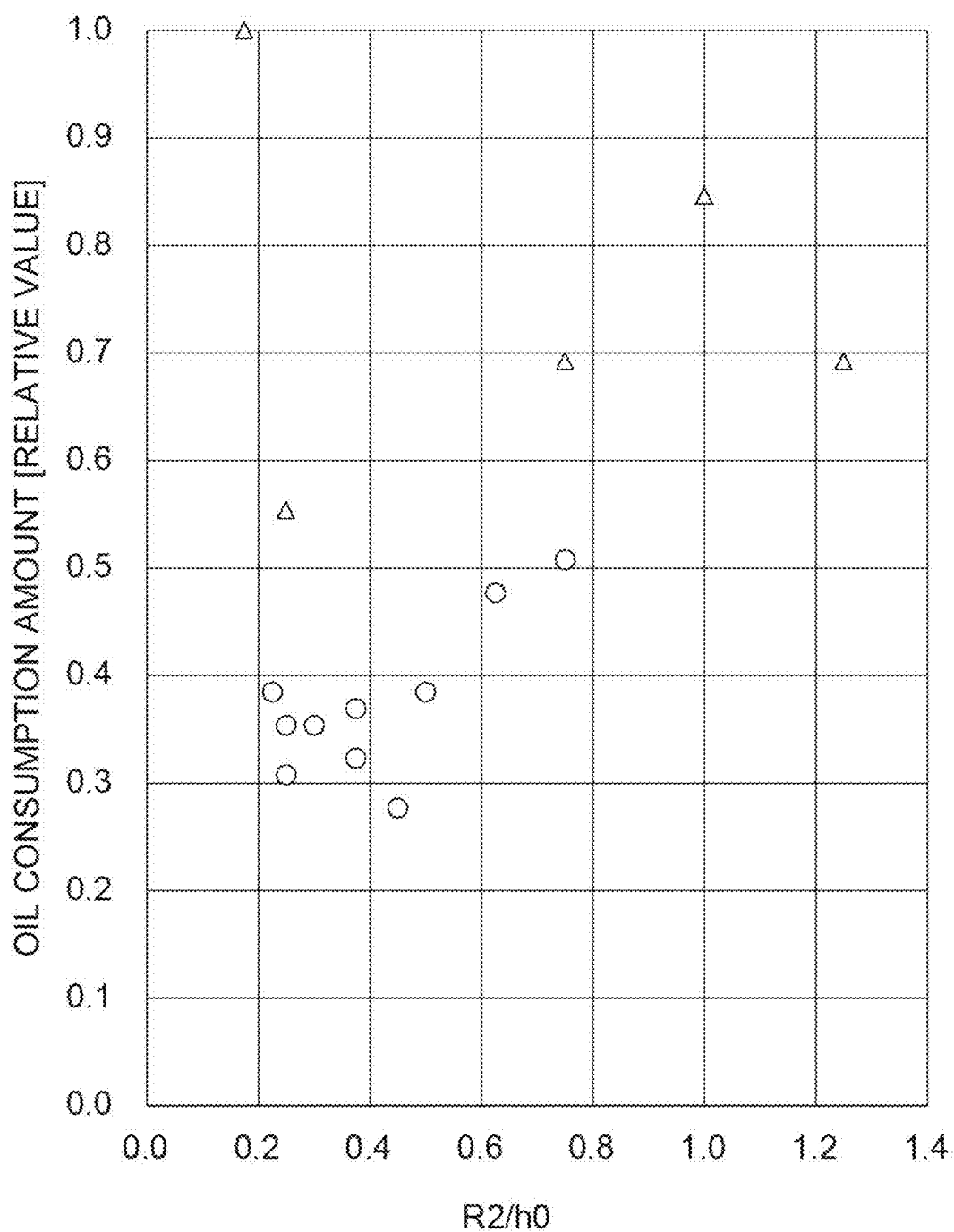
FIG. 18 is a graph plotting results of the examples and the comparative examples.
Figure 19:
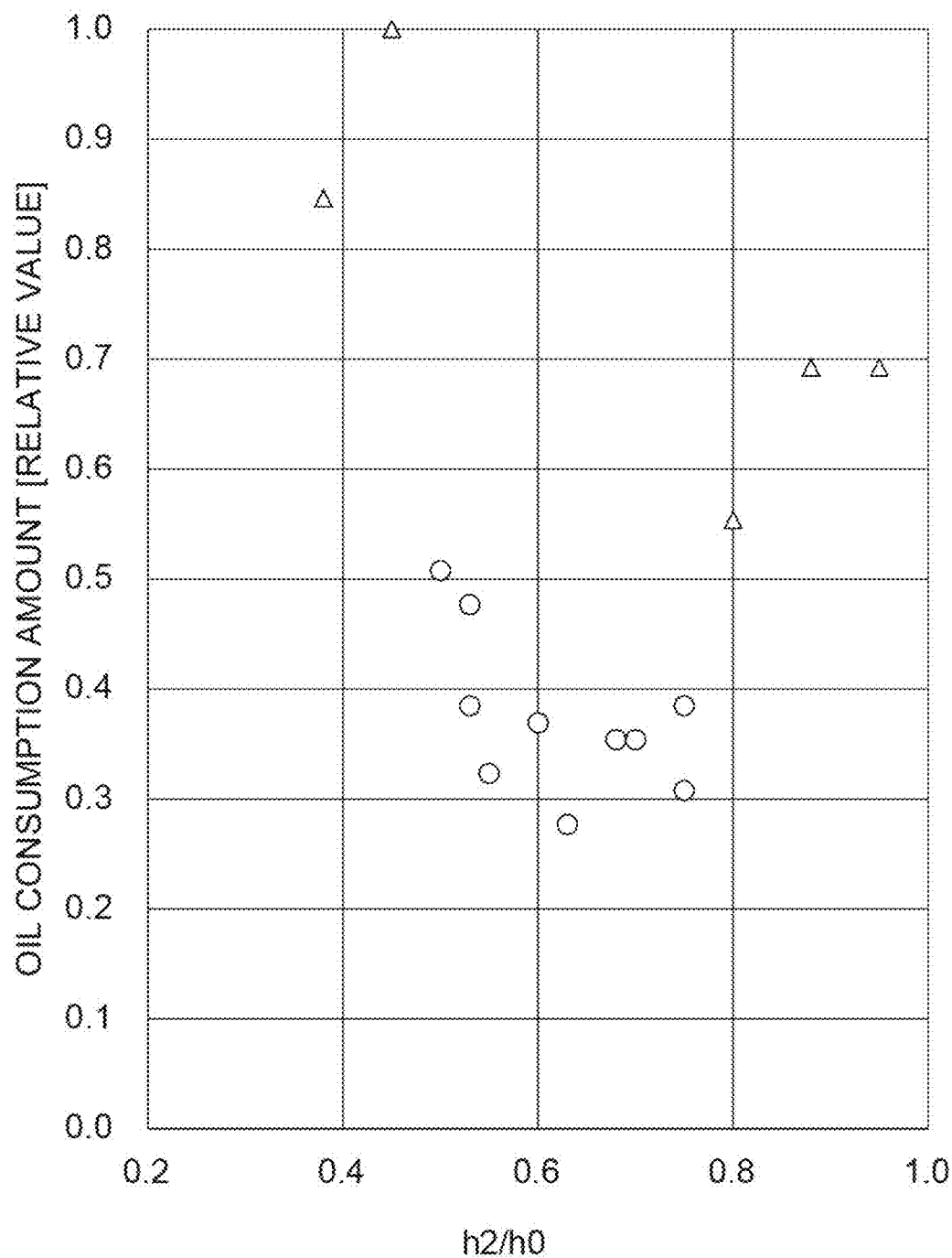
FIG. 19 is a graph plotting results of the examples and the comparative examples.
Figure 20:
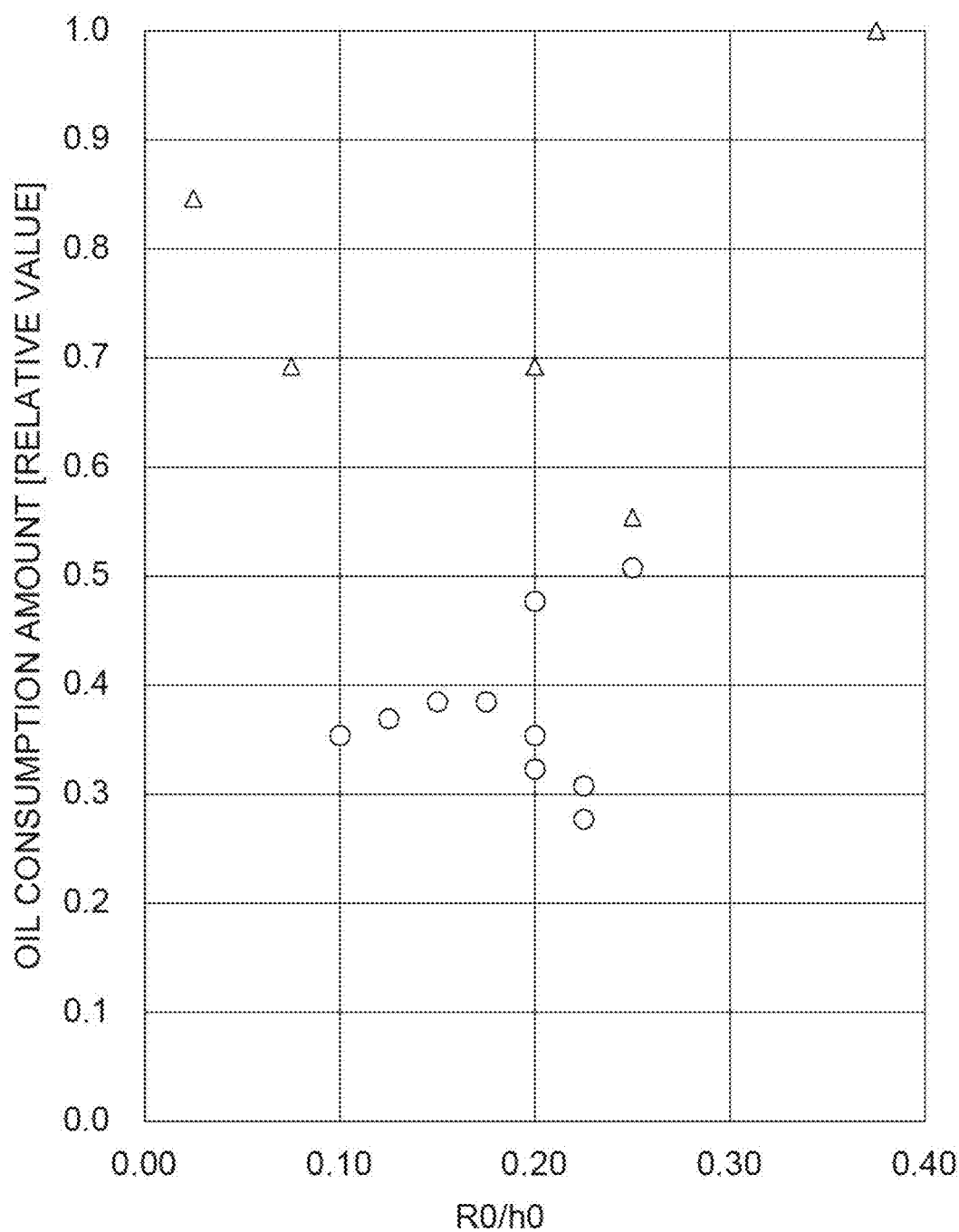
FIG. 20 is a graph plotting results of the examples and the comparative examples.
Figure 21:
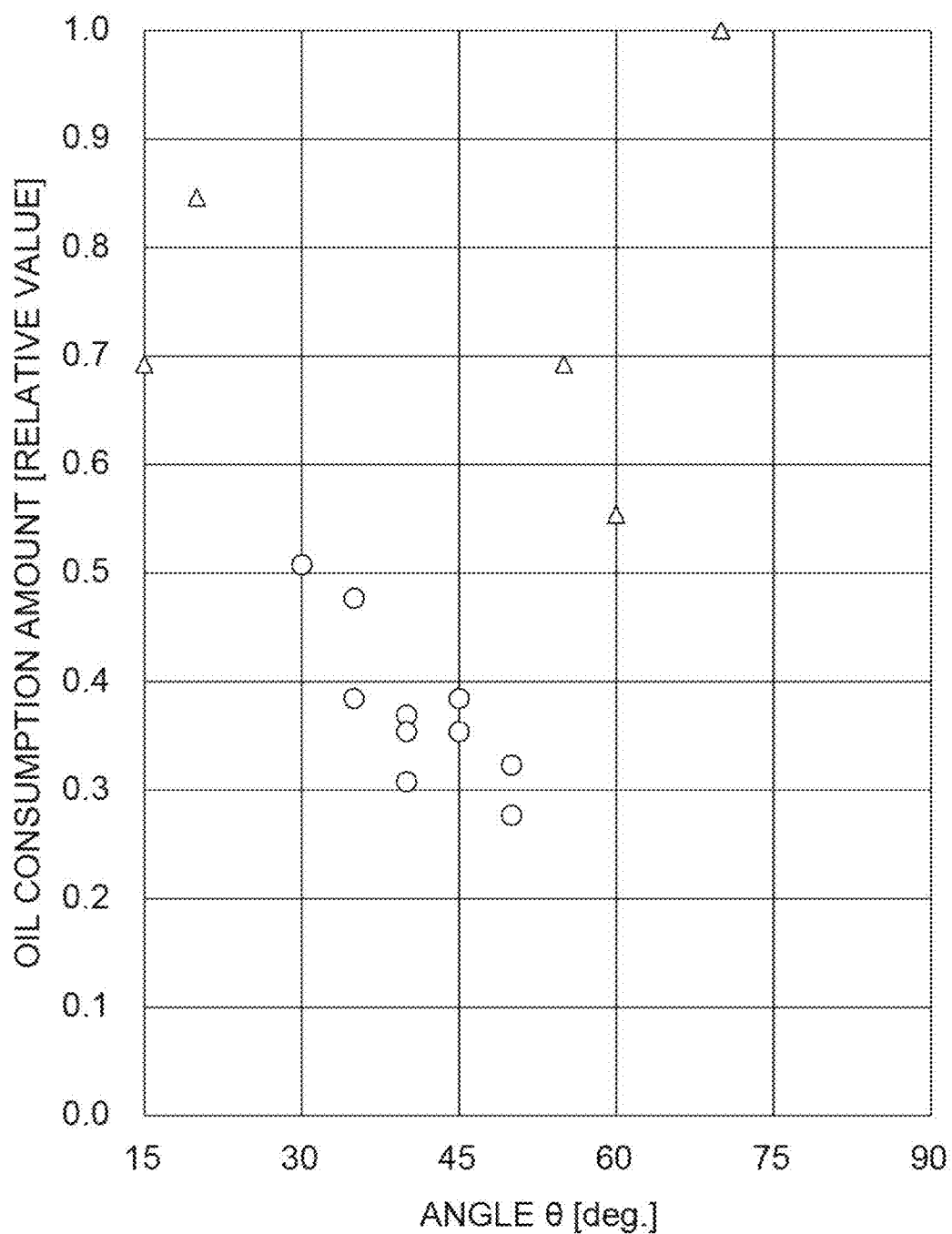
FIG. 21 is a graph plotting results of the examples and the comparative examples.
Figure 22:
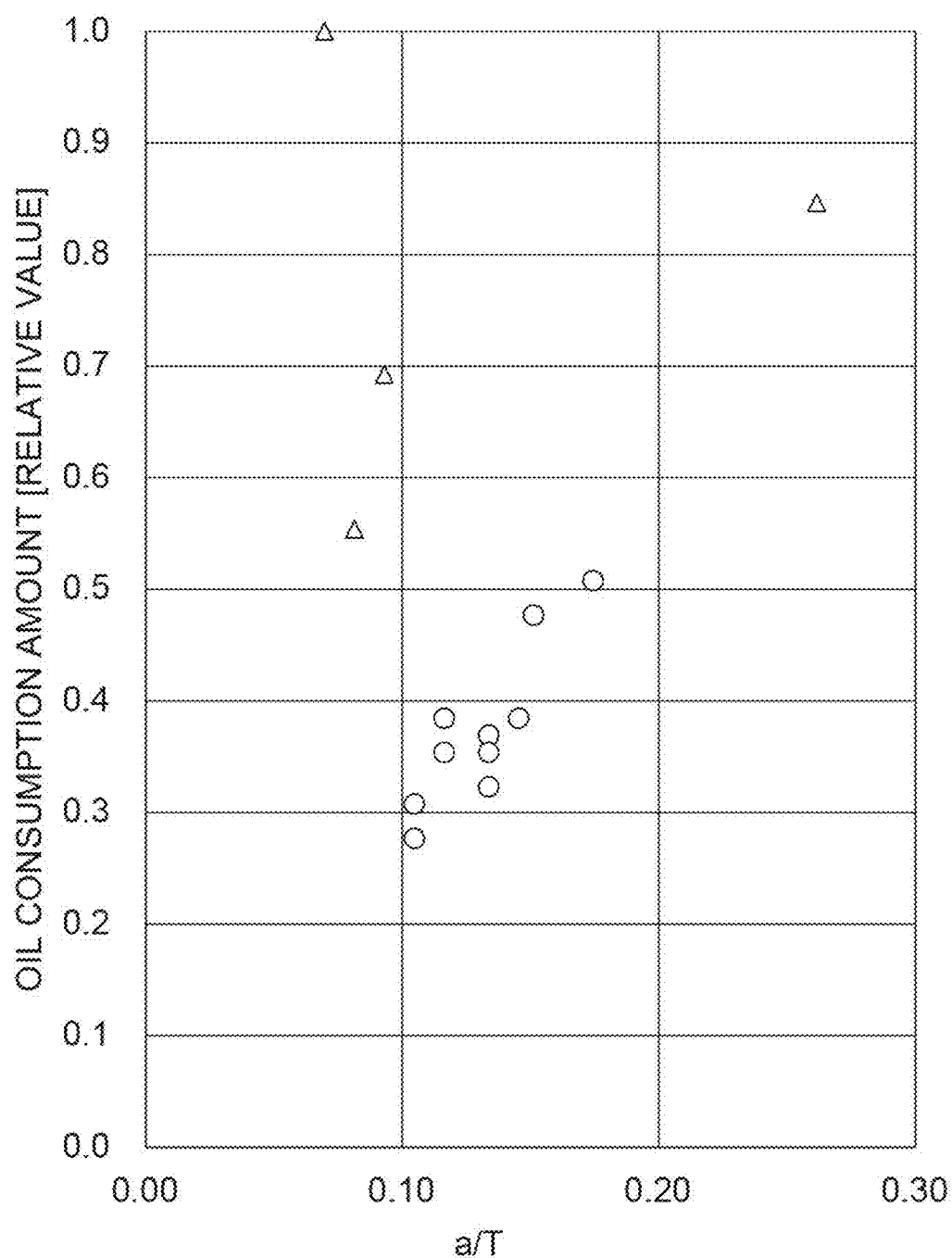
FIG. 22 is a graph plotting results of the examples and the comparative examples.

In the embodiment, the side rails 1 and 2 having a vertically symmetrical shape in an axial cross section has been provided as an example; however, as shown in FIG. 15, the outer peripheral surfaces of the side rails may be vertically asymmetrical in an axial cross section. In a side rail 11 shown in FIG. 15, an outer tip portion 11h of an outer peripheral surface 11a is shifted downward (to a crank chamber side). FIGS. 16A and 16B are cross-sectional views of a spacer expander and the side rail 11 mounted thereon, and are cross-sectional views showing different forms of the spacer expander. The side rail 11 has an outer peripheral surface 11a; an inner peripheral surface 11b; first and second side surfaces 11c and 11d; a first inclined surface 11e between the outer peripheral surface 11a and the first side surface 11c; and a second inclined surface 11f between the outer peripheral surface 11a and the second side surface 11d. An inclination angle θ1 of the first inclined surface 11e, for example, 30° to 70°, preferably 30° to 60°. An inclination angle θ2 of the second inclined surface 11f is, for example, larger than 0° and 60° or less, preferably larger than 0° and 50° or less. The outer tip portion 11h and the second side surface 11d may be continuously provided without the second inclined surface 11f intervening between the outer tip portion 11h (rounded portion) and the second side surface 11d.

According to an oil control ring in which the side rail 11 is mounted, the outer tip portion 11h abuts against an inner surface of a cylinder with high surface pressure, and the oil scraping-off action during downward stroke of the piston can be enhanced. In addition, by shifting the outer tip portion 11h to a side surface 11d side in an axial cross section, the outer tip portion 11h can be pressed against the inner surface of the cylinder, and the inner peripheral side of the side rail 11 is easily inclined upward (combustion chamber side) with the outer tip portion 11h as a fulcrum. For this reason, the inner peripheral side of the side surface 11c of the side rail 11 can reliably come into contact with an upper surface of a ring groove, so that sealing performance can be improved. This effect can be expected particularly during upward stroke of the piston, namely, when the oil control ring is seated on a lower surface side of the ring groove of the piston for a long time. Accordingly, the oil consumption amount can be reduced by suppressing the oil rise in the engine.

EXAMPLES

Hereinafter, the present disclosure will be described based on examples. The present invention is not limited to the contents of the following examples.

Example 1

[Production of Oil Control Ring]

A side rail with settings shown in Example 1 of Table 1 was produced using a SUS440 hoop wire rod (0.40 mm×1.70 mm) On the other hand, a spacer expander having the same configuration as the spacer expander 10F shown in FIG. 12 was produced using a piano wire hoop material (0.25 mm×1.9 mm) The inclination angle α of ear portions of the spacer expander was set to 10°. The settings of an oil control ring were as follows (refer to FIGS. 13, 2B, and 3).
  Combination height h1: 2.0 mm
  Combination thickness a1: 2.3 mm
  Combination tension for nominal diameter of oil control ring: 0.3 N/mm Examples 2 to 10 and Comparative Examples 1 to 5

Side rails and spacer expanders with settings shown in Tables 1 to 3 were respectively produced, and oil control rings were obtained in the same manner as in Example 1 except for using the side rails and the spacer expanders.

<Measurement of Oil Consumption Amount>

The oil consumption amounts were evaluated under the following conditions. Tables 1 to 3 listed relative values based on the oil consumption amount of Comparative Example 1. FIGS. 17 to 22 are graphs plotting results of the examples and the comparative examples. In these graphs, plots of the examples are indicated by "○", and plots of the comparative examples are indicated by "Δ".
  Engine: Four-stroke gasoline engine
  Material of top ring: SWOSC-V (outer peripheral surface: chromium nitride ion-plating treatment)
  Material of second ring: SWOSC-V (entire surface: zinc phosphate treatment)
  Coolant temperature: 100° C.
  Engine oil temperature: 125° C.
  Engine oil: 5W-20 (viscosity classification SAE J300)
  Load condition: Wide open throttle
  Average piston speed: 20 m/s
  Engine operating time: 30 hours

TABLE 1

|  |  | Example 1 | Example 2 | Example 3 | Example 4 | Example 5 |
|---|---|---|---|---|---|---|
| Inner peripheral surface | R1 [mm] | 0.35 | 0.40 | 0.30 | 0.44 | 0.33 |
|  | R1/h0 | 0.88 | 1.00 | 0.75 | 1.10 | 0.83 |
|  | R2 [mm] | 0.15 | 0.10 | 0.30 | 0.20 | 0.15 |
|  | R2/h0 | 0.38 | 0.25 | 0.75 | 0.50 | 0.38 |
|  | R1/R2 | 2.33 | 4.00 | 1.00 | 2.20 | 2.20 |
|  | h2 [mm] | 0.22 | 0.30 | 0.20 | 0.21 | 0.24 |
|  | h2/h0 | 0.55 | 0.75 | 0.50 | 0.53 | 0.60 |
| Outer peripheral surface | R0 [mm] | 0.08 | 0.09 | 0.10 | 0.06 | 0.05 |
|  | R0/h0 | 0.20 | 0.23 | 0.25 | 0.15 | 0.13 |
| Angle θ [°] of inclined surface |  | 50 | 40 | 30 | 35 | 40 |
| a [mm] |  | 0.23 | 0.18 | 0.30 | 0.25 | 0.23 |
| T [mm] |  | 1.72 | 1.72 | 1.72 | 1.72 | 1.72 |
| a/T |  | 0.13 | 0.10 | 0.17 | 0.15 | 0.13 |
| Inclination angle α [°] of ear portion |  | 20 | 15 | 20 | 10 | 20 |
| Oil consumption amount (relative value) |  | 0.32 | 0.31 | 0.51 | 0.38 | 0.37 |

TABLE 2

|  |  | Example 6 | Example 7 | Example 8 | Example 9 | Example 10 |
| --- | --- | --- | --- | --- | --- | --- |
| Inner peripheral surface | R1 [mm] | 0.42 | 0.39 | 0.36 | 0.36 | 0.31 |
|  | R1/h0 | 1.05 | 0.98 | 0.90 | 0.90 | 0.78 |
|  | R2 [mm] | 0.12 | 0.18 | 0.09 | 0.10 | 0.25 |
|  | R2/h0 | 0.30 | 0.45 | 0.23 | 0.25 | 0.63 |
|  | R1/R2 | 3.50 | 2.17 | 4.00 | 3.60 | 1.24 |
|  | h2 [mm] | 0.27 | 0.25 | 0.30 | 0.28 | 0.21 |
|  | h2/h0 | 0.68 | 0.63 | 0.75 | 0.70 | 0.53 |
| Outer peripheral surface | R0 [mm] | 0.08 | 0.09 | 0.07 | 0.04 | 0.08 |
|  | R0/h0 | 0.20 | 0.23 | 0.18 | 0.10 | 0.20 |
| Angle θ [°] of inclined surface |  | 45 | 50 | 45 | 40 | 35 |
| a [mm] |  | 0.20 | 0.18 | 0.20 | 0.23 | 0.26 |
| T [mm] |  | 1.72 | 1.72 | 1.72 | 1.72 | 1.72 |
| a/T |  | 0.12 | 0.10 | 0.12 | 0.13 | 0.15 |
| Inclination angle α [°] of ear portion |  | 20 | 15 | 20 | 15 | 20 |
| Oil consumption amount (relative value) |  | 0.35 | 0.28 | 0.38 | 0.35 | 0.48 |

TABLE 3

|  |  | Comparative Example 1 | Comparative Example 2 | Comparative Example 3 | Comparative Example 4 | Comparative Example 5 |
| --- | --- | --- | --- | --- | --- | --- |
| Inner peripheral surface | R1 [mm] | 0.45 | 0.45 | 0.20 | 0.50 | 0.24 |
|  | R1/h0 | 1.13 | 1.13 | 0.50 | 1.25 | 0.60 |
|  | R2 [mm] | 0.07 | 0.10 | 0.50 | 0.40 | 0.30 |
|  | R2/h0 | 0.18 | 0.25 | 1.25 | 1.00 | 0.75 |
|  | R1/R2 | 6.43 | 4.50 | 0.40 | 1.25 | 0.80 |
|  | h2 [mm] | 0.18 | 0.32 | 0.35 | 0.15 | 0.38 |
|  | h2/h0 | 0.45 | 0.80 | 0.88 | 0.38 | 0.95 |
| Outer peripheral surface | R0 [mm] | 0.15 | 0.10 | 0.08 | 0.01 | 0.03 |
|  | R0/h0 | 0.38 | 0.25 | 0.20 | 0.03 | 0.08 |
| Angle θ [°] of inclined surface |  | 70 | 60 | 55 | 20 | 15 |
| a [mm] |  | 0.12 | 0.14 | 0.16 | 0.45 | 0.60 |
| T [mm] |  | 1.72 | 1.72 | 1.72 | 1.72 | 1.72 |
| a/T |  | 0.07 | 0.08 | 0.09 | 0.26 | 0.35 |
| Inclination angle α [°] of ear portion |  | 20 | 15 | 10 | 15 | 10 |
| Oil consumption amount (relative value) |  | 1.00 | 0.55 | 0.69 | 0.85 | 0.69 |

INDUSTRIAL APPLICABILITY

According to the present disclosure, the side rail and the oil control ring including the same that are capable of sufficiently suppressing an increase in oil consumption amount even when the internal combustion engine operates at a high rotation speed are provided.

REFERENCE SIGNS LIST 1, 2, 11: side rail (a pair of side rails), 1a, 2a: outer peripheral surface, 1b, 2b: inner peripheral surface, 1c: first side surface, 1d: second side surface, 1e: first inclined surface, 1f: second inclined surface, 1g, 3g: inner tip portion, 1h, 11h: outer tip portion, 5: ear portion, 7: rail facing portion, 7a: depression, 7b: raised portion, 7c: flat portion, 10A to 10F: spacer expander, 50: oil control ring, C1, C2: convex curved portion, G: center of gravity, P1, P2: peripheral edge portion (first peripheral edge portion), Q1, Q2: second peripheral edge portion.

The invention claimed is:

1. An oil control ring comprising:
a pair of side rails including a first side rail and a second side rail; and
a spacer expander disposed between the pair of side rails,
wherein each of the first side rail and the second side rail comprises:
a first side surface extending in a radial direction of a side rail;
a second side surface extending in the radial direction opposite the first side surface, wherein a height of the side rail is taken from the first side surface to the second side surface in an axial direction of the side rail;
an outer peripheral surface;
an inner peripheral surface having a vertically symmetrical shape with respect to a center line in an axial cross section of the side rail;
a first inclined surface between the outer peripheral surface and the first side surface; and
a second inclined surface between the outer peripheral surface and the second side surface,
wherein the spacer expander comprises a plurality of ear portions, and a plurality of rail facing portions provided adjacent to the ear portions and facing the first side surface of the first side rail and a second side surface of the second side rail,
wherein the inner peripheral surface of the first side rail and an inner peripheral surface of the second side rail abut against the plurality of ear portions,
wherein the inner peripheral surface forms a continuous surface that comprises a curved inner tip portion intersecting the center line, and a curved peripheral edge portion extending between the inner tip portion and the first side surface,
wherein, in the axial cross section, the inner tip portion satisfies $0.7 \leq R1/h0 \leq 1.1$, wherein R1 represents a curvature radius of a curve forming the inner tip portion, and h0 represents the height of the side rail,
wherein in the axial cross section, the peripheral edge portion has a curvature radius that is less than the curvature radius of the inner tip portion,
wherein the peripheral edge portion is a first peripheral edge portion of the inner peripheral surface, that is curved convexly,
wherein the inner peripheral surface comprises a second peripheral edge portion that is curved convexly and extends between the inner tip portion and the second side surface in the axial cross section,
wherein, in the axial cross section, the first peripheral edge portion and the second peripheral edge portion satisfy $0.2 \leq R2/h0 \leq 0.5$, wherein R2 represents a curvature radius of curves forming the first peripheral edge portion and the second peripheral edge portion,
wherein the outer peripheral surface comprises an outer tip portion satisfying $0.1 \leq R0/h0 \leq 0.23$, wherein R0 represents a curvature radius of a curve forming the outer tip portion,
wherein in the axial cross section, a distance is taken in the radial direction from a tip of the outer peripheral surface to a boundary between the first side surface and the first inclined surface, and a thickness of the side rail is taken in the radial direction from the tip of the outer peripheral surface to a tip of the inner peripheral surface, and wherein the first inclined surface is set to satisfy $0.1 \leq a/T \leq 0.2$, wherein a represents the distance in the radial direction, and T represents the thickness of the side rail.

2. The oil control ring according to claim 1,
wherein at least one of an inclination angle $\theta 1$ of the first inclined surface and an inclination angle $\theta 2$ of the second inclined surface, with respect to the radial direction, is 30° to 50°.

3. The oil control ring according to claim 1,
wherein the side rail has a vertically symmetrical shape with respect to the center line, in the axial cross section, and
wherein the inner peripheral surface is continuously curved from the center line to the first side surface.

4. The oil control ring according to claim 1, further comprising:
a hard coating that covers at least the outer peripheral surface.

5. The oil control ring according to claim 1,
wherein an inclination angle $\alpha$ of the ear portions with respect to the axial direction of the oil control ring is 5° to 30°.

6. The oil control ring according to claim 5,
wherein the rail facing portions comprise flat portions against which the pair of side rails abut,
wherein the flat portions are formed along an edge portion on an outer peripheral side of the spacer expander, and
wherein in the axial cross section, centers of gravity of the pair of side rails are located inwardly relative to the flat portions in the radial direction.

7. The oil control ring according to claim 1,
wherein the inner peripheral surface is continuously curved along the inner tip portion and the peripheral edge portion,
wherein the curvature radius of the inner tip portion is a first curvature radius, and
wherein the peripheral edge portion includes a first portion extending along a second curvature radius that is less than the first curvature radius, and a second portion extending along a third curvature radius that is less than the second curvature radius.

8. The oil control ring according to claim 1,
wherein the outer peripheral surface includes an outer tip portion to contact a surface, and
wherein in the axial cross section, the outer tip portion is curved along a curvature radius that forms an outermost tip in the radial direction of the side rail, and the curvature radius of the outer tip portion is less than the curvature radius of the inner tip portion of the inner peripheral surface.

9. An oil control ring comprising:
a spacer expander extending substantially in a ring-shape; and
a pair of side rails including a first side rail and a second side rail, and extending in a circumferential direction along the spacer expander,
wherein each of the first side rail and the second side rail comprises:
  a first side surface extending substantially in a radial direction of the spacer expander;
  a second side surface extending substantially in the radial direction, wherein the second side surface is located opposite the first side surface in an axial direction of the spacer expander and a height of the side rail is taken from the first side surface to the second side surface in an axial direction of the side rail;
  an inner peripheral surface contacting the spacer expander, wherein the inner peripheral surface forms a continuous surface from the first side surface to the second side surface, that includes a curved inner tip portion forming an innermost tip in the radial direction, and a curved inner edge portion extending between the inner tip portion and the first side surface, and wherein, in an axial cross-section of the side rail, the inner tip portion has a curvature radius that is different from a curvature radius of the inner edge portion;
  an outer peripheral surface located opposite the inner peripheral surface in the radial direction, wherein the outer peripheral surface includes a curved outer tip portion that forms an outermost tip of the side rail in the radial direction, and wherein in the axial cross-section of the side rail, the outer tip portion has a curvature radius that is less than the curvature radius of the inner tip portion;
  a first inclined surface between the outer peripheral surface and the first side surface; and
  a second inclined surface between the outer peripheral surface and the second side surface,
wherein the spacer expander comprises a plurality of ear portions, and a plurality of rail facing portions provided adjacent to the ear portions and facing the first side surface of the first side rail and a second side surface of the second side rail,
wherein the inner peripheral surface of the first side rail and an inner peripheral surface of the second side rail abut against the plurality of ear portions,
wherein the inner peripheral surface forms a continuous surface that comprises a curved inner tip portion intersecting the center line, and a curved peripheral edge portion extending between the inner tip portion and the first side surface,
wherein, in the axial cross section, the inner tip portion satisfies $0.7 \leq R1/h0 \leq 1.1$, wherein R1 represents a curvature radius of a curve forming the inner tip portion, and h0 represents the height of the side rail,
wherein in the axial cross section, the peripheral edge portion has a curvature radius that is less than the curvature radius of the inner tip portion,
wherein the peripheral edge portion is a first peripheral edge portion of the inner peripheral surface, that is curved convexly,
wherein the inner peripheral surface comprises a second peripheral edge portion that is curved convexly and extends between the inner tip portion and the second side surface in the axial cross section,
wherein, in the axial cross section, the first peripheral edge portion and the second peripheral edge portion satisfy $0.2 \leq R2/h0 \leq 0.5$, wherein R2 represents a curvature radius of curves forming the first peripheral edge portion and the second peripheral edge portion,
wherein the outer peripheral surface comprises an outer tip portion satisfying $0.1 \leq R0/h0 \leq 0.23$, wherein R0 represents a curvature radius of a curve forming the outer tip portion,
wherein in the axial cross section, a distance is taken in the radial direction from a tip of the outer peripheral surface to a boundary between the first side surface and the first inclined surface, and a thickness of the side rail is taken in the radial direction from the tip of the outer peripheral surface to a tip of the inner peripheral surface, and wherein the first inclined surface is set to satisfy $0.1 \leq a/T \leq 0.2$, wherein a represents the distance in the radial direction, and T represents the thickness of the side rail.

10. The oil control ring according to claim 9, wherein, in an axial cross-section of the side rail, a center line extends in the radial direction at a center between the first side surface and the second side surface, and the inner tip portion intersects the center line.

11. The oil control ring according to claim 10, wherein the outer tip portion intersects the center line in the axial cross-section.

12. The oil control ring according to claim 9, wherein the inner peripheral surface is continuously curved along the inner tip portion and the inner edge portion, wherein the inner edge portion includes a first portion that extends from the inner tip portion, and a second portion that is located between the first portion and the first side surface, wherein the curvature radius of the inner tip portion is a first curvature radius, wherein the first portion of the inner edge portion has a second curvature radius that is less than the first curvature radius, and wherein the second portion of the inner edge portion has a third curvature radius that is less than the second curvature radius.

13. The oil control ring according to claim 9, wherein the ear portions extend at an angle of 5° to 30° with respect to the axial direction.

* * * * *